US007350615B2

(12) United States Patent
Maeno et al.

(10) Patent No.: US 7,350,615 B2
(45) Date of Patent: Apr. 1, 2008

(54) VEHICLE ANTI THEFT SYSTEM, VEHICLE ANTI THEFT METHOD, AND COMPUTER PROGRAM

(75) Inventors: Yoshihiko Maeno, Hyogo (JP); Hiroshi Takeuchi, Hyogo (JP); Toshitaka Yamato, Hyogo (JP); Satoshi Harumoto, Hyogo (JP); Naotoshi Miyamoto, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 507 days.

(21) Appl. No.: 10/805,461

(22) Filed: Mar. 22, 2004

(65) Prior Publication Data

US 2004/0188164 A1 Sep. 30, 2004

(30) Foreign Application Priority Data

Mar. 26, 2003 (JP) ............................ 2003-085813
Jul. 31, 2003 (JP) ............................ 2003-284288

(51) Int. Cl.
*B60R 25/00* (2006.01)

(52) U.S. Cl. ...................................................... 180/287

(58) Field of Classification Search ................ 180/287, 180/271; 280/735; 701/36
See application file for complete search history.

(56) References Cited

U.S. PATENT DOCUMENTS 6,795,111 B1 * 9/2004 Mazzilli ..................... 348/148
7,091,833 B1 * 8/2006 Davis ...................... 340/426.1

FOREIGN PATENT DOCUMENTS

JP A 2002-257013 9/2002
JP A 2003-085676 3/2003

* cited by examiner

*Primary Examiner*—Faye M. Fleming
(74) *Attorney, Agent, or Firm*—Oliff & Berridge, PLC.

(57) ABSTRACT

A theft-deterrent system for a vehicle includes at least one detecting unit that detects information on damage of the vehicle including vehicle theft or vandalizing of the vehicle, at least one prevention unit that executes a preventive measure against the damage, a situation identifying unit that identifies a situation of the damage based on order of detection of the information, a degree-of-danger judging unit that judges a degree of danger based on the situation, and a theft-deterrent control unit that selects and controls the at least one prevention unit corresponding to the degree of danger to execute the preventive measure against the damage.

14 Claims, 47 Drawing Sheets

FIG.3

VEHICLE THEFT MODE (RIDE-AWAY)

| MODE / SENSOR/ACTUATOR | BEFORE THEFT | | | | | | | DURING THEFT | | | | | | | | | |
|---|---|---|---|---|---|---|---|---|---|---|---|---|---|---|---|---|---|
| | KEY STOLEN | APP-ROACH | PRE-VENTION | CONTACT | THREATE-NING | SHOOT-ING | RE-PORTING | INTRU-DING ACTION | THREATE-NING | INTRU-SION BLOCKING | INTRU-SION DETEC-TION | BEFORE IGNITION | IGNITION BLOCK-ING | BLOCKING CONVEY | THREATE-NING | SHOOT-ING | RE-PORTING |
| APPROACH DETECTION SENSOR | | ○ | | | | | | | | | | | | | | | |
| CONTACT DETECTION SENSOR | | | | ○ | | | | | | | | | | | | | |
| PICKING SENSOR | | | | | | | | ○ | | | | | | | | | |
| GLASS BREAK SENSOR | | | | | | | | ○ | | | | | | | | | |
| DOOR PRE-OPEN DETECTION | | | | | | | | ○ | | | | | | | | | |
| ENGINE PRE-IGNITION DETECTION | | | | | | | | | | | | ○ | | | | | |
| INTRUSION DETECTION SENSOR | | | | | | | | | | | ○ | | | | | | |
| VEHICLE LOCATION SENSOR(GPS) | | | | | | | | | | | | | | | | | |
| DATABASE | | | | | | | | | | | | | | | | | |
| CONVEY CONTROLLER | | | | | | | | | | | | | | | | | |
| EQUIPMENT CODE AUTHENTICATION FUNCTION | | | | | | | | | | | | | ○ | | | | |
| USER AUTHENTICATION DEVICE | | | | | | | | | | ○ | | | ○ | | | | |
| IMAGING DEVICE | | | | | | ○ | | | | | | | | | | ○ | |
| ALARM DEVICE | | | | | ○ | | | | ○ | | | | | | ○ | | |
| HUMAN-FIGURE GENERATOR | | | ○ | | | | | | | | | | | | | | |
| SECURITY OPERATION EXPRESSING DEVICE | | | ○ | | | | | | | | | | | | | | |
| WINDSHIELD SHUTTER FUNCTION | | | ○ | | | | | | | | | | | | | | |
| RADIO COMMUNICATION EQUIPMENT | | | | | | | ○ | | | | | | | | | | ○ |
| STEERING LOCK ECU | | | | | | | | | | | | | | ○ | | | |

FIG.4

1.ACQUISITION OF INFORMATION FROM EACH SENSOR AND SITUATION IDENTIFICATION

| | BEFORE THEFT | DURING THEFT | | | AFTER THEFT |
|---|---|---|---|---|---|
| SENSOR | CASING | DRIVE-UP | UPLIFT | SET | CONVEY |
| CAMERA | ○ | ○ | ○ | ○ | ○ |
| APPROACH SENSOR | ○ | ○ | | | |
| CONTACT SENSOR | | | ○ | ○ | ○ |
| INCLINATION SENSOR | | | ○ | ○ | ○ |
| GPS | | | | | |

2.JUDGMENT OF DEGREE OF DANGER AND THEFT PREVENTION CONTROL

| SENSOR | SENSOR JUDGMENT CONDITION | | | |
|---|---|---|---|---|
| APPROACH SENSOR | NO APPROACH | APPROACH | | |
| CAMERA | - | OWNER'S FACE | FACE OTHER THAN OWNER'S | NUMBER OF TIMES WHEN FACE OTHER THAN OWNER'S IS DISPLAYED |
| DEGREE OF DANGER | 0 | 0 | 1 | 2 |
| THEFT PREVENTION CONTROL | - | - | - | WARN (VOICE, WINKER) |
| | - | - | SHOOT FACE AND STORE IT IN MEMORY | NOTIFIE BY COMMUNICATION |
| | | | | NOTIFIE WHEN OWNER RIDES A CAR NEXT TIME (VOICE, DISPLAY) |

DURING THEFT

| SENSOR | SENSOR JUDGMENT CONDITION | | | |
|---|---|---|---|---|
| APPROACH SENSOR | NO APPROACH | APPROACH | - | - |
| CAMERA | - | WRECKER RECOGNIZE | - | - |
| CONTACT SENSOR | - | APPROACH | APPROACH | APPROACH |
| INCLINATION SENSOR | - | NO INCLINATION | SMALL INCLINATION | LARGE INCLINATION |
| DEGREE OF DANGER | 0 | 1 | 2 | 3 |
| THEFT PREVENTION CONTROL | - | SHOOT WRECKER AND STORE IT IN MEMORY | SHOOT WRECKER AND STORE IT IN MEMORY | SHOOT WRECKER AND STORE IT IN MEMORY |
| | - | NOTIFIE BY COMMUNICATION | ALARM (HORN) | THREAT (SMOKE GENERATION) |
| | - | - | NOTIFIE BY COMMUNICATION | NOTIFIE BY COMMUNICATION |

AFTER THEFT

| SENSOR | SENSOR JUDGMENT CONDITION | |
|---|---|---|
| GPS | NO TRANSFER | DETECTE VEHICLE CONVEY |
| CAMERA | - | SHOOT SCENE AND STORE IT IN MEMORY |
| DEGREE OF DANGER | 3 | 4 |
| | - | REPORT |
| | - | OPERATE,HORN,ETC.AND DISABLE VEHICLE EQUIPMENT |

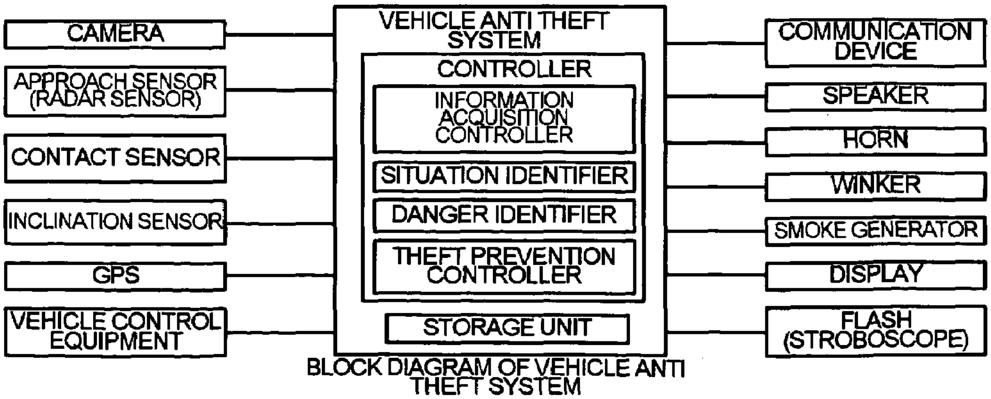

BLOCK DIAGRAM OF VEHICLE ANTI THEFT SYSTEM

FIG.5

| SERVICE FIELD | | GOAL | SCENE | FACTOR | CRITICAL CASE |
|---|---|---|---|---|---|
| VEHICLE THEFT | RIDE-AWAY<br>PREVENTION PREDICTION WARNING | | CASING FOR THEFT (APPROACH OF SUSPICIOUS PERSON) | PARKING LOT (DESERTED) | SUSPICIOUS PERSON IS FOUND REPORT OR THREAT<br>CAR APT TO BE STOLEN |
| | | | | SIGNS OF HUMAN PRESENCE KEY STORAGE(STORING CONDITION) | SIGNS OF HUMAN PRESENCE ARE FELT, MAKING THIEF TO BELIEVE THAT COMMITMENT FAILED |
| | DETECTION ALARM NOTIFICA-TION IN MEMORY BLOCKING REPULSE | | INTRUDED IN VEHICLE | NO KEY | PICKING<br>GLASS BREAKING |
| | | | | KEY STOLEN | INTRUSION ATTEMPTED WITH STOLEN KEY |
| | | | NO IMMOBILIZER IGNITION TRIED | INTRUSION SUCCEEDED | W/H DIRECTLY CONNECTED |
| | | | WITH IMMOBILIZER IGNITION TRIED | PARTS REPLACED KEY STOLEN | EFI REPLACED<br>IGNITION STARTED WITH STOLEN KEY |
| | | | STOLEN VEHICLE BEING CONVEYED (POSSIBLY STOLEN) | THEFT SUCCEEDED | CAR TRAVELS WHERE THE OWNER DOES NOT USUALLY GO |
| | TRACE BLOCKING FINDING DISABLE REUSE | | STOLEN VEHICLE BEING CONVEYED | THEFT SUCCEEDED | STOLEN VEHICLE CONVEYED |
| | | | STOLEN CAR SOLD | | · LICENSE PLATE DETACHED (REPLACED)<br>· PARTS SOLD<br>· EXPORTED |
| | STOLEN BY WRECKER | | CASING FOR THEFT (APPROACH OF SUSPICIOUS PERSON) | PARKING PLACE (DESERTED) | · SUSPICIOUS PERSON IS FOUND AND REPORTED OR DEMORALIZED<br>· CAR DIFFICULT TO BE STOLEN |
| | | | | SIGNS OF HUMAN PRESENCE KEY STORAGE (STORING CONDITION) | · SIGNS OF HUMAN PRESENCE ARE FELT, MAKING THIEF TO BELIEVE THAT COMMITMENT FAILED |
| | | | OPERATION OF VEHICLE THEFT | | · APPROACH OF VEHICLE, ETC |
| | | | STOLEN VEHICLE MOVED(POSSIBLY STOLEN) | THEFT SUCCEEDED | · CAR TRAVELS WHERE THE OWNER DOES NOT USUALLY GO |
| | | | STOLEN VEHICLE CONVEYED | THEFT SUCCEEDED | · STOLEN CAR CONVEYED ON REAL TIME |
| | | | STOLEN CAR SOLD | | · PLATE DETACHED (REPLACED)<br>· PARTS SOLD<br>· EXPORTED |
| | PARTS STOLEN | | EQUIPMENT REMOVED | | |
| | | | TIRE DEFLATED | | |
| | | | PLACING PEDESTAL UNDER VEHICLE | | |
| | | | TIRE STOLEN | | |
| | | | PLATE STOLEN | | |
| | VANDALI-ZING | | DAMAGED | | |
| | | | VANDALIZING WITH WIPERS | | |
| | | | CHILDREN CLIMBING ON HOOD | | |
| | | | ARSON ATTACK | | |
| | | | TIRE DEFLATED | | |

FIG.6

○: CAN BE DONE BY ONESELF
△: ACHIEVED BY APPROACH FROM OTHER PARTY
(EX. ACHIEVED BY APPROACHES BY CAR AND ROAD SIDE)
×: CANNOT BE ACHIEVED WITHOUT CAR-TO-CAR INFORMATION

[VEHICLE THEFT] (IN CASE OF RIDE-AWAY)

| SERVICE FIELD | | GOAL | SCENE | FACTOR | CRITICAL CASE | PERCEPTION/ RECOGNITION OF INFORMATION (1) | PERCEPTION/ RECOGNITION OF INFORMATION (2) | POSSIBI-LITY BY HUMAN |
|---|---|---|---|---|---|---|---|---|
| VEHICLE THEFT | PREVENTION PREDICTION WARNING | | CASING FOR THEFT (APPROACH OF SUSPICIOUS PERSON) | ·PARKING LOT<br>·HUMAN PRESENCE<br>·KEY STORAGE | ·DETECTION OF SUSPICIOUS PERSON AND REPORTING THREATENING,<br>·CAR DIFFICULT TO BE STOLEN<br>·TO ALLOW SUSPICIOUS PERSON TO FEEL PRESENCE OF HUMAN<br>·TO MAKE SUSPICIOUS PERSON BELIEVE THAT COMMITMENT (ATTEMPTED) FAILED | ·TO DETECT PERSON WHO MAKES SUSPICIOUS ACTION BY FREQUENTLY COMING AROUND THE VEHICLE | ·TO DETECT BY APPROACH OF SUBSTANCE (BY RADIO WAVE) | × |
| | | | | | | | ·TO RECOGNIZE HUMAN FACE | × |
| | | | | | | | ·TO DETECT BY SOUND | × |
| | | | | | | | ·TO DETECT BY SMELL | × |
| | | | | | | | ·TO DETECT BY LIGHT AND SHADE | × |
| | | | | | | | ·TO DETECT BY TEMPERATURE | × |
| | | | | | | | ·TO DETECT MOVEMENT OF DOOR KNOB | × |
| | | | | | | | ·TO DETECT VIBRATION | × |
| | | | | | | | ·TO LINK KEY WITH OTHER EQUIPMENT (TO DETECT WHEN KEY LEAVES STORAGE PLACE OR OWNER BODY) | ○ |
| | | | | | | ·TO DETECT CONTACT<br>·TO DETECT ROBBERY OR LOSS OF KEY<br>·TO RECOGNIZE THAT THE CAR IS POPULAR CAR TO BE STOLEN | ·TO HAVE THEFT INFORMATION FROM POLICE DEPARTMENT, CENTER, ETC | ○ |
| | | | | | | | ·TO ACQUIRE INFORMATION ON MODUS OPERANDI | |
| | | | | | | | ·TO NOTIFY TO CENTER, ETC BY ONESELF | |
| | | | | | | ·TO KNOW THAT THE CAR IS PARKED FOR A LONG TIME | ·TO DETECT LOCATION INFORMATION AND STANDING TIME | |

○: CAN BE DONE BY ONESELF
△: ACHIEVED BY APPROACH FROM OTHER PARTY (EX. ACHIEVED BY APPROACHES

○ : CAN BE DONE BY ONESELF
× : CANNOT BE DONE BY ONESELF

○ : CAN BE DONE BY ONESELF
× : HOLDS FOR BY ACCUMULATED INFORMATION

| POSSIBILITY BY AUTONOMOUS PROCESS | APPLIED TECHNIQUE | JUDGMENT/ ACTION (1) | JUDGMENT/ ACTION (2) | POSSIBILITY BY HUMAN | POSSIBILITY BY AUTONOMOUS PROCESS | APPLIED TECHNIQUE | JOY | COMPLEMENT |
|---|---|---|---|---|---|---|---|---|
| ○ | ·UWB (DETECTION OF HUMAN APPROACH: UP TO 2 M) | ·TO JUDGE APPROACH | ·TO REPORT (TO CENTER OR OWNER BY CELLULAR PHONE) ·TO WARN | × | ○ | ·RECOGNITION ALGORITHM ·ALARM ·RADIO COMMUNICATION | ·VEHICLE IRREGULARITY CAN BE JUDGED FROM A LONG DISTANCE | BY USING OTHER APPROACH SENSOR TO ACTIVATE SENSOR OF LARGE CURRENT CONSUMPTION SUCH AS CAMERA, ETC, THE CAMERA, ETC ARE OPERATED ONLY WHEN SUSPICIOUS PERSON APPROACHES TO REDUCE CURRENT CONSUMPTION |
| ○ | ·SURROUNDING MONITORING CAMERA (NIGHT-VISION: 360°) ·IMAGE RECOGNITION (RECOGNITION OF FACE) | ·TO ASSUME AS SUSPICIOUS PERSON (TO RECOGNIZE SAME FACE IN A PLURALITY OF TIMES AND COLLATE WITH CRIMINALS DATA) | ·TO TAKE PICTURE OF FACE | × | × | | ·FACE OF CRIMINAL CAN BE IDENTIFIED | |
| ○ | ·MICROPHONE (TO DETECT SOUND OF FOOTSTEPS) | ·TO MAKE SUSPICIOUS PERSON FEEL HUMAN PRESENCE | ·TO GENERATE HUMAN FIGURE | × | ○ | ·STEREOSCOPIC VISION | ·TO MAKE SUSPICIOUS PERSON ABANDON THE INTENTION TO STEAL (PREVENTION) | TO PREVENT THEFT BY MAKING SUSPICIOUS PERSON TO FEEL HUMAN PRESENCE BY HUMAN FIGURE |
| ○ ○ ○ | ·SMELL SENSOR (SMELL OF HUMAN) ·LIGHT SENSOR (FLASHLIGHT IN THE NIGHTTIME, ETC) | ·TO MAKESUSPICIOUS PERSON RECOGNIZE IT AS THE CAR DIFFICULT TO STEAL | ·TO MAKE SUSPICIOUS PERSON RECOGNIZE SECURITY ACTION | × | ○ | | | |
| | ·IR SENSOR (TO DETECT HUMAN TEMPERATURE) | ·TO DISCOURAGE DESIRE TO STEAL | ·TO MAKE THE CAR INSIDE INVISIBLE | × | ○ | ·PHOTOCHROMIC GLASS (LCD SHUTTER) | | BY LINKING THE KEY WITH OTHER EQUIPMENT, NOTIFY THE OWNER WHENEVER THE KEY IS AWAY FROM THE SPECIFIED POSITION |
| | ·POWER SUPPLY MANAGEMENT (DARK CURRENT CONTROL OF SYSTEM) | ·TO MAKE SUSPICIOUS PERSON BELIEVE HIS COMMITMENT IS FOUND | ·TO SET OFF A FLASH BULB | × | ○ | | | |
| ○ | ·DOOR SW ·VIBRATION SENSOR | ·TO JUDGE ROBBERY OR LOSS OF KEY | ·TO ISSUE AN ALARM | × | ○ | | ·TO KNOW LOSS OF KEY ·TO KNOW DEGREE OF DANGER OF ONE'S CAR ·TO KNOW POINTS TO WATCH OUT | BASED ON THE THEFT DATABASE INFORMATION ON MODUS OPERANDI OF THEFT AND PLACES TO PREFERENTIALLY WATCH OUT ARE VARIED |
| ○ | ·LINKAGE WITH OTHER EQUIPMENT | ·TO JUDGE IT AS A POPULAR CAR | ·TO REPORT | × | ○ | | | |
| △ | ·(LINKAGE WITH CELLULAR PHONE, WRIST WATCH, ETC) | ·TO JUDGE BY PRIORITY MONITOR BY MODUS OPERANDI | ·TO KEEP A LOOKOUT FOR PRIORITY MONITOR PLACES (TO INCREASE SENSOR SENSITIVITY) | × | ○ | | | WHEN ANY MOTION IS NOT MADE FOR A SPECIFIED TIME, THE PLACE IS LOCKED AS LONG-TERM PARKING CAR, AND IF IT IS MOVED, THE CASE IS JUDGED AS THEFT |
| | ·RADIO COMMUNICATION ·DATABASE (THEFT INFORMATION) | ·TO JUDGE IT AS LONG-PARKED CAR | ·TO REINFORCE VIGILANCE | × | ○ | | | |
| ○ | ·POSITIONING (GPS) ·RADIO COMMUNICATION | (JUDGE AUTONOMOUSLY BY REQUEST FROM USER, POSITION, AND TIME) | ·TO LOCK THE POSITION | × | ○ | | | |

[VEHICLE THEFT] (IN CASE OF RIDE-AWAY)

○: CAN BE DONE BY ONESELF
△: ACHIEVED BY APPROACH FROM OTHER PARTY
(EX. ACHIEVED BY APPROACHES BY CAR AND ROAD SIDE)
×: CANNOT BE ACHIEVED WITHOUT CAR-TO-CAR INFORMATION

| SERVICE FIELD | | GOAL | SCENE | FACTOR | CRITICAL CASE | PERCEPTION/ RECOGNITION OF INFORMATION (1) | PERCEPTION/ RECOGNITION OF INFORMATION (2) | POSSIBILITY BY HUMAN |
|---|---|---|---|---|---|---|---|---|
| | DETECTION<br>ALARM NOTIFICATION IN MEMORY BLOCKING<br>REPULSE | | INTRUSION DETECTED | | ·PICKING | ·CHANGE OF VEHICLE CONDITION BY PICKING | ·VIBRATION<br>·IMAGES<br>·SOUND<br>·PICKING SENSOR | × |
| | | | | | ·GLASS BREAKING | ·GLASS BREAKAGE DETECTED | ·VIBRATION<br>·SOUND (GLASS BREAKAGE SENSOR)<br>·ATMOSPHERIC PRESSURE | × |
| | | | INTRUSION ATTEMPTED BY STOLEN KEY | ·KEY STOLEN | ·STOLEN KEY | ·ILLEGAL KEY OWNER DETECTED | ·PERSONAL AUTHENTICATION OF KEY (FINGER PRINTS, ETC)<br>·PERSONAL AUTHENTICATION BY KEY AND VEHICLE SIDE (OUTSIDE THE VEHICLE) (FACE, IRIS, VOICE, GESTURE)<br>·PERSONAL EQUIPMENT AUTHENTICATION BY KEY AND OTHERS (CELLULAR PHONE, WRISTWATCH, ACCESSORY, ETC) | × |
| | | | INTRUDED IN VEHICLE | ·OPENING OF DOOR SUCCEEDED | | ·DETECTION OF INTRUDER | ·TO DETECT BY IMAGE<br>·TO DETECT BY SOUND<br>·TO DETECT BY BODY BUILD AND WEIGHT<br>·TO DETECT BY RADAR | × |

○: CAN BE DONE BY ONESELF
△: ACHIEVED BY APPROACH FROM OTHER PARTY (EX. ACHIEVED BY APPROACHES

○ : CAN BE DONE BY ONESELF
× : CANNOT BE DONE BY ONESELF

○ : CAN BE DONE BY ONESELF
× : HOLDS FOR BY ACCUMULATED INFORMATION

| POSSIBILITY BY AUTONOMOUS PROCESS | APPLIED TECHNIQUE | JUDGMENT/ ACTION (1) | JUDGMENT/ ACTION (2) | POSSIBILITY BY HUMAN | POSSIBILITY BY AUTONOMOUS PROCESS | APPLIED TECHNIQUE | JOY | COMPLEMENT |
|---|---|---|---|---|---|---|---|---|
| ○<br>○ | ·VIBRATION SENSOR<br>·IMAGE RECOGNITION (RECOGNITION OF PICKING MOTION)<br>·PICKING SENSOR (DETECTION OF FOREIGN MATTER IN DOOR CLEARANCE)<br>·VIBRATION SENSOR<br>·ACOUSTIC SENSOR<br>·ATMOSPHERIC PRESSURE SENSOR | ·JUDGMENT OF PICKING<br>→WARNING, THREATENING<br>→REPORTING<br>·JUDGMENT OF GLASS BREAKAGE<br>→WARNING, THREATENING<br>→REPORTING | ·SIREN, SOUND<br>·RADIO COMMUNICATION TO CENTER AND OWNER<br>·TRANSMISSION OF FACE OF CRIMINAL | ×<br>× | ○<br>○ | ·RADIO COMMUNI-CATION<br>·ENCRYP-TION | ·TO KNOW HARM TO VEHICLE (TO KNOW THE POSSIBILITY OF BEING STOLEN) | |
| ○ | ·BIOLOGICAL AUTHENTICATION (FINGER-PRINT AUTHENTICATION BY KEY FACE; IRIS, VOICE, GESTURE)<br>·EQUIPMENT AUTHENTICATION: CELLULAR PHONE, WRISTWATCH<br>·CAMERAS OUTSIDE CABIN | ·JUDGES OTHER THAN OWNER<br>→VEHICLE IS LOCKED (DOOR DENIES UNLOCKING)<br>→WARNING, THREATENING<br>→REPORTING | ·DOOR LOCK<br>·SIREN, VOICE<br>·RADIO COMMUNICATION TO CENTER AND OWNER<br>·FACE OF CRIMINAL TRANSMITTED | × | ○ | ·RADIO COMMUNI-CATION<br>·ENCRYP-TION | CANNOT BE INTRUDED EVEN WHEN KEY IS STOLEN | AUTHENTICATION FUNCTION IS PROVIDED FOR KEY TO DENY USE OF THE KEY OTHER THAN THE OWNER SELF(WHEN DOOR IS ENTERED, DOOR IS UNLOCKED BY AND ACHIEVED BY KEY AND VEHICLE-SIDE PERSONAL AUTHENTICATION)FOR THE ABOVE AUTHENTICATION FUNCTION, TO LINK WITH OTHER EQUIPMENT (WRISTWATCH, ETC) |
| ○ | ·CABIN CAMERA (TAKING PICTURE OF INTRUDER)<br>·IMAGE RECOGNITION (INTRUSION IS CAUGHT BY CHANGE OF IMAGE)<br>·ACOUSTIC SENSOR (NOISE OF INTRUSION)<br>·SEAT POSITION SENSOR (DETECTION BY SEAT ADJUSTMENT OF INTRUDER)<br>·PASSENGER DETECTION SENSOR (JUDGED BY SEAT LOADS)<br>·UWB | ·JUDGED AS INTRUSION IT IS KNOWN THAT THE CAR IS INTRUDED<br>→VEHICLE IS LOCKED (DOOR DENIES UNLOCKING)<br>→WARNING, THREATENING<br>→REPORTING | ·SIREN, VOICE<br>·RADIO COMMUNICATION TO CENTER AND OWNER<br>·FACE OF CRIMINAL TRANSMITTED | × | ○ | ·RADIO COMMUNI-CATION<br>·ENCRYP-TION | ·JUDGED AS INTRUSION IT IS KNOWN THAT THE CAR IS INTRUDED | PERSONAL AUTHENTICATION IS SIMPLY CARRIED OUT BY DETECTING SEAT POSITION, WEIGHT AND BODY BUILD BY PASSENGER SENSOR |

[VEHICLE THEFT] (IN CASE OF RIDE-AWAY)

○: CAN BE DONE BY ONESELF
△: ACHIEVED BY APPROACH FROM OTHER PARTY
(EX. ACHIEVED BY APPROACHES BY CAR AND ROAD SIDE)
×: CANNOT BE ACHIEVED WITHOUT CAR-TO-CAR INFORMATION

| SERVICE FIELD | | GOAL | SCENE | FACTOR | CRITICAL CASE | PERCEPTION/ RECOGNITION OF INFORMATION (1) | PERCEPTION/ RECOGNITION OF INFORMATION (2) | POSSIBILITY BY HUMAN |
|---|---|---|---|---|---|---|---|---|
| | | | NO IMMOBILIZER) IGNITION TRIED | ·INTRUSION SUCCEEDED | ·W/H DIRECTLY CONNECTED | ·DETECTION OF W/H OPERATION | ·DETECTED BY DISCONNECTION | × |
| | | | WITH IMMOBILIZER) IGNITION TRIED | ·PARTS REPLACED | ·EFI REPLACED | ·DETECTION OF EFI REPLACEMENT | ·EQUIPMENT CODE | × |
| | | | | | | | ·BIOLOGICAL AUTHENTICATION (FINGER-PRINT, IRIS, VEIN ) | × |
| | | | INTRUSION ATTEMPTED BY STOLEN KEY | ·KEY STOLEN | ·IGNITION STARTED BY STOLEN KEY | ·DETECTION OF ILLEGAL KEY OWNER | ·PERSONAL AUTHENTICATION BY KEY AND VEHICLE SIDE (FACE, IRIS, VOICE, GESTURE) → PASSENGER SENSOR (WEIGHT, BODY BUILD), SEAT POSITION | × |
| | | | STOLEN VEHICLE MOVED (POSSIBLY STOLEN) | ·THEFT SUCCEEDED | ·CAR TRAVELS WHERE THE OWNER DOES NOT USUALLY GO | ·TO KNOW REGULAR VEHICLE USING PATTERN OF OWNER | ·TO COMPILE DATABASE OF POSITION INFORMATION | × |
| | | | | | | | ·TO KNOW THE POSITION | |
| | | | | | | ·TO KNOW THE POSITION WHERE THE OWNER LAST GOT OFF THE CAR | ·TO KNOW THE POSITION | × |
| | | | | | | | ·TO DETECT THE MOVE BY ODOR METER | |
| | | | | | | ·DISRUPTION OF COMMUNICATION WITH CENTER | ·TO DETECT ANSWER-BACK | × |

○: CAN BE DONE BY ONESELF
△: ACHIEVED BY APPROACH FROM OTHER PARTY (EX. ACHIEVED BY APPROACHES

○ : CAN BE DONE BY ONESELF
× : CANNOT BE DONE BY ONESELF

○ : CAN BE DONE BY ONESELF
× : HOLDS FOR BY ACCUMULATED INFORMATION

| POSSIBILITY BY AUTONOMOUS PROCESS | APPLIED TECHNIQUE | JUDGMENT/ ACTION (1) | JUDGMENT/ ACTION (2) | POSSIBILITY BY HUMAN | POSSIBILITY BY AUTONOMOUS PROCESS | APPLIED TECHNIQUE | JOY | COMPLEMENT |
|---|---|---|---|---|---|---|---|---|
| ○<br>○ | ·DETECTION BY DIRECT CONNECTION<br>·EQUIPMENT AUTHENTICATION (AUTHENTICATION IS IMPLEMENTED MUTUALLY WITH EQUIPMENT OTHER THAN EFI) | ·IGNITION BY W/H DIRECT CONNECTION JUDGED →EFI STOPPING → WARNING AND DEMORALIZING →REPORTING<br>·REPLACEMENT JUDGED<br>·JUDGMENT OF GLASS BREAKAGE →WARNING, THREATENING →REPORTING | ·SIREN, VOICE<br>·RADIO COMMUNICATION TO CENTER AND OWNER<br>·PARTS IMMOBILIZER (EQUIPMENT AUTHENTICATION)<br>·SIREN, VOICE<br>·RADIO COMMUNICATION TO CENTER AND OWNER<br>·STEERING LOCKED | ×<br>×<br>×<br>×<br>× | ○<br>○<br>○<br>○<br>○ | ·RADIO COMMUNICATION<br>·ENCRYPTION | EVEN IF INTRUDED, UNABLE TO BE OPERATED | WITH EFI LINKED WITH VEHICLE EQUIPMENT, VEHICLE DOES NOT FUNCTION UNLESS AUTHENTICATION CODE IS MATCHED |
| ○<br>○<br>△ | ·POSITIONING (GPS)<br>·RADIO COMMUNICATION<br>·DATABASE<br>·REGULAR ACTION TRAJECTORY IS STORED IN MEMORY (OWN CAR OR CENTER)<br>·PERIODICAL CALL FROM CENTER BY RADIO COMMUNICATION | ·DEVIATION FROM ACTION PATTERN JUDGMENT OF MOVE<br>·JUDGES OTHER THAN OWNER<br>·JUDGES OTHER THAN OWNER | ·RADIO COMMUNICATION TO CENTER AND OWNER<br>·WARNING | ×<br>× | △<br>○ | ·RADIO COMMUNICATION<br>·ENCRYPTION | MOVE OF VEHICLE (THEFT) IS KNOWN | DEVIATION FROM VEHICLE ACTION OF OWNER IS DETECTED AND ALARM IS ISSUED<br>THEFT IS DETECTED BY THE MOVE OF ODOMETER<br>VEHICLE IS PERIODICALLY CALLED BY RADIO BY CENTER OR OWNER AND IF COMMUNICATION IS BLOCKED, THE CASE IS JUDGED AS THEFT |

[VEHICLE THEFT] (IN CASE OF RIDE-AWAY)

o: CAN BE DONE BY ONESELF
Δ: ACHIEVED BY APPROACH FROM OTHER PARTY
(EX. ACHIEVED BY APPROACHES BY CAR AND ROAD SIDE)
×: CANNOT BE ACHIEVED WITHOUT CAR-TO-CAR INFORMATION

| SERVICE FIELD | | GOAL | SCENE | FACTOR | CRITICAL CASE | PERCEPTION/ RECOGNITION OF INFORMATION (1) | PERCEPTION/ RECOGNITION OF INFORMATION (2) | POSSIBILITY BY HUMAN |
|---|---|---|---|---|---|---|---|---|
| | DETECTION<br>ALARM NOTIFICATION IN MEMORY BLOCKING<br>REPULSE | | IN TRANSIT | ·THEFT SUCCEEDED | ·STOLEN CAR IS MOVING | ·MOVING POSITION IS DETECTED | ·STOLEN CAR IS MOVING | × |
| | | | SOLD | | ·LICENSE PLATE IS REMOVED | ·REMOVAL OF LICENSE PLATE IS DETECTED | ·LICENSE PLATE IS REMOVED | × |
| | | | | | ·PARTS ARE SOLD | ·ILLEGAL USE OF PARTS IS DETECTED | ·PARTS ARE SOLD | × |
| | | | | | ·EXPORTED | ·THE USE REGIONS ARE DETECTED | ·EXPORTED | × |

○: CAN BE DONE BY ONESELF
△: ACHIEVED BY APPROACH FROM OTHER PARTY (EX. ACHIEVED BY APPROACHES

○ : CAN BE DONE BY ONESELF
× : CANNOT BE DONE BY ONESELF

○ : CAN BE DONE BY ONESELF
× : HOLDS FOR BY ACCUMULATED INFORMATION

| POSSIBILITY BY AUTONOMOUS PROCESS | APPLIED TECHNIQUE | JUDGMENT/ ACTION (1) | JUDGMENT/ ACTION (2) | POSSIBILITY BY HUMAN | POSSIBILITY BY AUTONOMOUS PROCESS | APPLIED TECHNIQUE | JOY | COMPLEMENT |
|---|---|---|---|---|---|---|---|---|
| ○ | ·POSITIONING (GPS)<br>·RADIO COMMUNICATION<br>·DATABASE<br>·SMART PLATE | ·OWN CAR POSITION IS TRANSMITTED<br>·IMAGES OF CRIMINAL AND CRIME COMMITMENT TRANSMITTED<br>·VEHICLE IS REMOTELY CONTROLLED | ·RADIO COMMUNICATION TO CENTER AND OWNER<br>·E/G STOPPED<br>·HORN ISSUED | × | ○ | ·RADIO COMMUNICATION<br>·ENCRYPTION<br>·LINKAGE WITH VEHICLE CONTROL<br>·LINKAGE WITH BODY CONTROL | ·LOCATION OF STOLEN CAR IS KNOWN<br>·TRANSFER CAN BE BLOCKED | |
| ○ | ·PLATE AUTHENTICATION TECHNIQUE<br>·AUTHENTICATION CONTROL ECU | ·REMOVAL JUDGED | ·VEHICLE ACTION FROZEN | × | ○ | | ·CANNOT BE REUSED EVEN IF STOLEN | LICENSE PLATE IS LINKED WITH EFI COMPUTER OR OTHER VEHICLE CONTROLLERS AND IF THE LICENSE PLATE ID IS NOT INCLUDED IN REGISTER, OPERATION OF EQUIPMENT IS DENIED |
| ○ | ·MUTUAL AUTHENTICATION OF EQUIPMENT<br>·AUTHENTICATION CONTROL ECU | ·REPLACEMENT JUDGED | ·EQUIPMENT ACTION FROZEN | × | ○ | | | EACH OF THE EQUIPMENT OF VEHICLE IS MUTUALLY ID-AUTHENTICATED, AND EVEN WHEN ANY OF THEM IS REMOVED AND ATTACHED TO OTHER VEHICLES, OPERATION OF EQUIPMENT IS DENIED |
| ○ | ·POSITIONING<br>·USE OF OTHER COUNTRIES SUPPRESSED BY REGION CODE | ·OUTSIDE OF USE REGION JUDGED | ·VEHICLE ACTION FROZEN | × | ○ | | | THE USE OF EQUIPMENT IS RESTRICTED BY REGION CODE. ECU FOR DOMESTIC USE IS NOT ALLOWED TO FUNCTION ABROAD |

[VEHICLE THEFT] (IN CASE OF WRECKER)

○: CAN BE DONE BY ONESELF
△: ACHIEVED BY APPROACH FROM OTHER PARTY
(EX. ACHIEVED BY APPROACHES BY CAR AND ROAD SIDE)
×: CANNOT BE ACHIEVED WITHOUT CAR-TO-CAR INFORMATION

| SERVICE FIELD | | GOAL | SCENE | FACTOR | CRITICAL CASE | PERCEPTION/ RECOGNITION OF INFORMATION (1) | PERCEPTION/ RECOGNITION OF INFORMATION (2) | POSSIBILITY BY HUMAN |
|---|---|---|---|---|---|---|---|---|
| VEHICLE THEFT | | | CASING FOR THEFT (APPROACH OF SUSPICIOUS PERSON) | ·PARKING PLACE<br>·SIGNS OF HUMAN PRESENCE<br>·KEY STORAGE | ·DETECTION OF SUSPICIOUS PERSON AND REPORTING AND DEMORALIZING<br>·CAR DIFFICULT TO BE STOLEN<br>·TO ALLOW SUSPICIOUS PERSON TO FEEL PRESENCE OF HUMAN<br>·TO MAKE SUSPICIOUS PERSON BELIEVE THAT COMMITMENT (ATTEMPTED) FAILED | ·TO DETECT PERSON WHO MAKES SUSPICIOUS ACTION BY FREQUENTLY COMING AROUND THE VEHICLE | ·TO DETECT BY APPROACH OF SUBSTANCE (BY RADIO WAVE) | × |
| | | | | | | | ·TO RECOGNIZE HUMAN FACE | × |
| | | | | | | | ·TO DETECT BY SOUND | × |
| | | | | | | | ·TO DETECT BY SMELL | × |
| | | | | | | | ·TO DETECT BY LIGHT AND SHADE | × |
| | | | | | | ·TO DETECT CONTACT | ·TO DETECT BY TEMPERATURE | × |
| | | | | | | ·TO RECOGNIZE THAT THE CAR IS POPULAR CAR TO BE STOLEN | ·TO DETECT MOVEMENT OF DOOR KNOB<br>·TO DETECT VIBRATION | × |
| | | | | | | | ·INFORMATION OF THEFT IS OBTAINED FROM POLICE DEPARTMENT, CENTER, ETC<br>·TO ACQUIRE INFORMATION ON MODUS OPERANDI | ○ |
| | | | | | | ·TO KNOW THAT THE CAR IS PARKED FOR A LONG TIME | ·TO NOTIFY TO CENTER, ETC BY ONESELF<br>·TO DETECT POSITION INFORMATION AND STANDING TIME | ○ |

Figure 15:
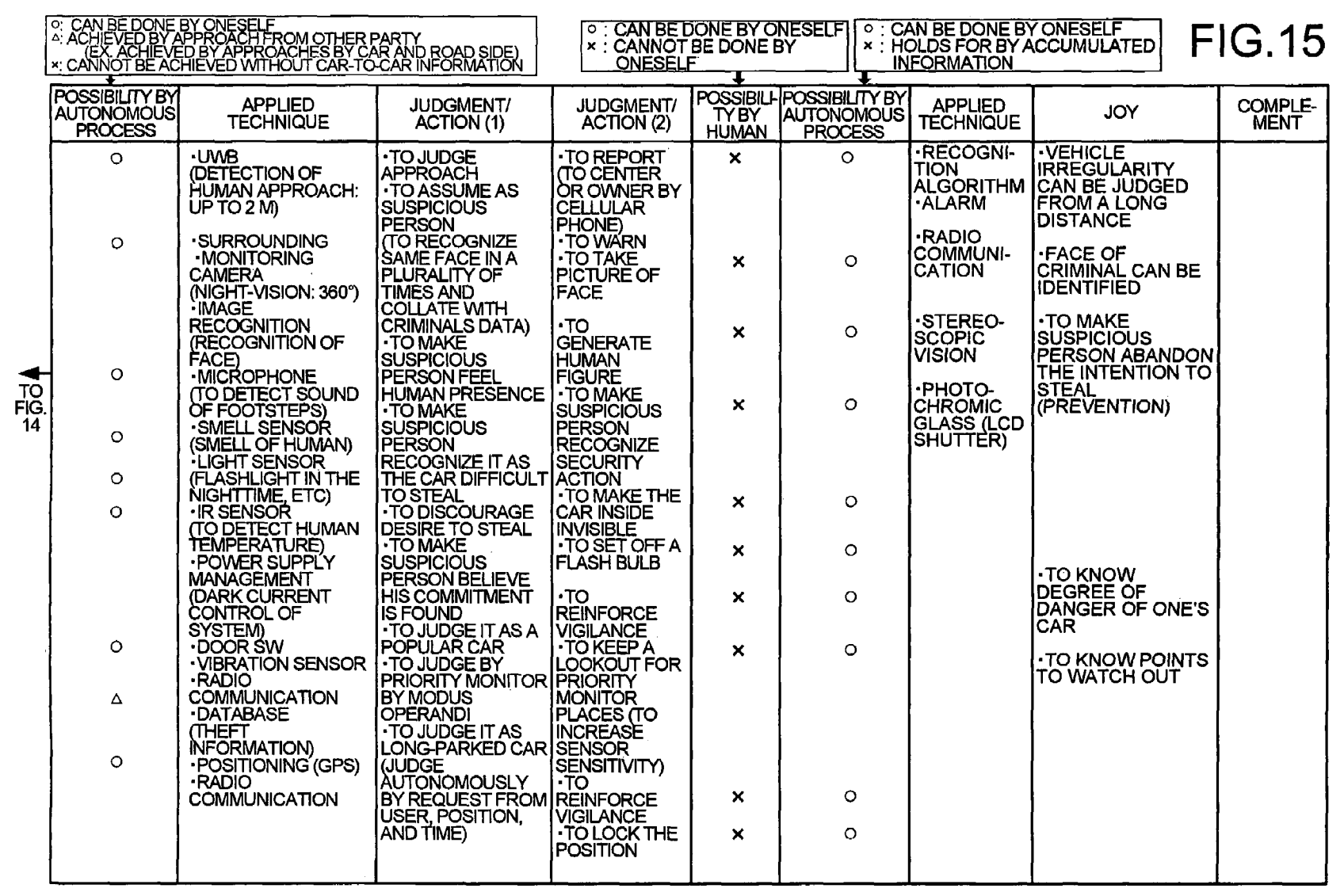

○: CAN BE DONE BY ONESELF
△: ACHIEVED BY APPROACH FROM OTHER PARTY (EX. ACHIEVED BY APPROACHES BY CAR AND ROAD SIDE)
×: CANNOT BE ACHIEVED WITHOUT CAR-TO-CAR INFORMATION

○ : CAN BE DONE BY ONESELF
× : CANNOT BE DONE BY ONESELF

○ : CAN BE DONE BY ONESELF
× : HOLDS FOR BY ACCUMULATED INFORMATION

TO FIG. 14

| POSSIBILITY BY AUTONOMOUS PROCESS | APPLIED TECHNIQUE | JUDGMENT/ ACTION (1) | JUDGMENT/ ACTION (2) | POSSIBILITY BY HUMAN | POSSIBILITY BY AUTONOMOUS PROCESS | APPLIED TECHNIQUE | JOY | COMPLEMENT |
|---|---|---|---|---|---|---|---|---|
| ○<br>○<br>○<br>○<br>○<br>○<br>○<br>△<br>○ | ·UWB (DETECTION OF HUMAN APPROACH: UP TO 2 M)<br>·SURROUNDING ·MONITORING CAMERA (NIGHT-VISION: 360°)<br>·IMAGE RECOGNITION (RECOGNITION OF FACE)<br>·MICROPHONE (TO DETECT SOUND OF FOOTSTEPS)<br>·SMELL SENSOR (SMELL OF HUMAN)<br>·LIGHT SENSOR (FLASHLIGHT IN THE NIGHTTIME, ETC)<br>·IR SENSOR (TO DETECT HUMAN TEMPERATURE)<br>·POWER SUPPLY MANAGEMENT (DARK CURRENT CONTROL OF SYSTEM)<br>·DOOR SW<br>·VIBRATION SENSOR<br>·RADIO COMMUNICATION<br>·DATABASE (THEFT INFORMATION)<br>·POSITIONING (GPS)<br>·RADIO COMMUNICATION | ·TO JUDGE APPROACH<br>·TO ASSUME AS SUSPICIOUS PERSON (TO RECOGNIZE SAME FACE IN A PLURALITY OF TIMES AND COLLATE WITH CRIMINALS DATA)<br>·TO MAKE SUSPICIOUS PERSON FEEL HUMAN PRESENCE<br>·TO MAKE SUSPICIOUS PERSON RECOGNIZE IT AS THE CAR DIFFICULT TO STEAL<br>·TO DISCOURAGE DESIRE TO STEAL<br>·TO MAKE SUSPICIOUS PERSON BELIEVE HIS COMMITMENT IS FOUND<br>·TO JUDGE IT AS A POPULAR CAR<br>·TO JUDGE BY PRIORITY MONITOR BY MODUS OPERANDI<br>·TO JUDGE IT AS LONG-PARKED CAR (JUDGE AUTONOMOUSLY BY REQUEST FROM USER, POSITION, AND TIME) | ·TO REPORT (TO CENTER OR OWNER BY CELLULAR PHONE)<br>·TO WARN<br>·TO TAKE PICTURE OF FACE<br>·TO GENERATE HUMAN FIGURE<br>·TO MAKE SUSPICIOUS PERSON RECOGNIZE SECURITY ACTION<br>·TO MAKE THE CAR INSIDE INVISIBLE<br>·TO SET OFF A FLASH BULB<br>·TO REINFORCE VIGILANCE<br>·TO KEEP A LOOKOUT FOR PRIORITY MONITOR PLACES (TO INCREASE SENSOR SENSITIVITY)<br>·TO REINFORCE VIGILANCE<br>·TO LOCK THE POSITION | ×<br>×<br>×<br>×<br>×<br>×<br>×<br>×<br>×<br>× | ○<br>○<br>○<br>○<br>○<br>○<br>○<br>○<br>○<br>○ | ·RECOGNITION ALGORITHM<br>·ALARM<br>·RADIO COMMUNICATION<br>·STEREOSCOPIC VISION<br>·PHOTOCHROMIC GLASS (LCD SHUTTER) | ·VEHICLE IRREGULARITY CAN BE JUDGED FROM A LONG DISTANCE<br>·FACE OF CRIMINAL CAN BE IDENTIFIED<br>·TO MAKE SUSPICIOUS PERSON ABANDON THE INTENTION TO STEAL (PREVENTION)<br>·TO KNOW DEGREE OF DANGER OF ONE'S CAR<br>·TO KNOW POINTS TO WATCH OUT | |

FIG.16

[VEHICLE THEFT] (IN CASE OF WRECKER)

○: CAN BE DONE BY ONESELF
△: ACHIEVED BY APPROACH FROM OTHER PARTY (EX. ACHIEVED BY APPROACHES BY CAR AND ROAD SIDE)
×: CANNOT BE ACHIEVED WITHOUT CAR-TO-CAR INFORMATION

○: CAN BE DONE BY ONESELF
△: ACHIEVED BY APPROACH FROM OTHER PARTY (EX. ACHIEVED BY APPROACHES BY CAR AND ROAD SIDE)
×: CANNOT BE ACHIEVED WITHOUT CAR-TO-CAR INFORMATION

| SERVICE FIELD | GOAL | SCENE | FACTOR | CRITICAL CASE | PERCEPTION/ RECOGNITION OF INFORMATION (1) | PERCEPTION/ RECOGNITION OF INFORMATION (2) | POSSIBILITY BY HUMAN | POSSIBILITY BY AUTONOMOUS PROCESS | COMPLEMENT |
|---|---|---|---|---|---|---|---|---|---|
| DETECTION<br>ALARM NOTIFICATION IN MEMORY BLOCKING<br>REPULSE | | ·APPROACH | | ·APPROACH OF VEHICLE, ETC | ·APPROACH IS DETECTED | ·DETECTED BY REFLECTION (RADAR, ETC)<br>·DETECTED BY NOISE<br>·DETECTED BY IMAGE<br>·DETECTED BY LIGHT | ×<br>×<br>×<br>× | ○<br>○<br>○<br>○ | ·UWB RADAR<br>·ACOUSTIC SENSOR<br>·IMAGE RECOGNITION OF SUSPICIOUS CAR BY CAMERAS OUTSIDE CABIN<br>·LIGHT SENSOR (HEADLAMP OF APPROACHING CAR)<br>·RADIO COMMUNICATION |
| | | UPLIFT | | UPLIFT | ·UPLIFT DETECTED | ·DETECTED BY INCLINATION<br>·DETECTED BY IMAGE<br>·DETECTED BY SOUND | ×<br>×<br>× | ○<br>○<br>○ | ·UPLIFT IS DETECTED BY CHANGE OF SCENES BY IMAGE RECOGNITION<br>·INCLINATION SENSOR<br>·CAMERA OUTSIDE CABIN<br>·ACOUSTIC SENSOR |

○ : CAN BE DONE BY ONESELF
× : CANNOT BE DONE BY ONESELF

○ : CAN BE DONE BY ONESELF
× : HOLDS FOR BY ACCUMULATED INFORMATION

| JUDGMENT/ ACTION (1) | JUDGMENT/ ACTION (2) | POSSIBILITY BY HUMAN | POSSIBILITY BY AUTONOMOUS PROCESS | APPLIED TECHNIQUE | JOY | COMPLEMENT |
|---|---|---|---|---|---|---|
| ·JUDGMENT OF SUSPICIOUS CAR (PERSON) | ·WARNING BY SIREN AND VOICE | × | ○ | | ·TO KNOW HARM TO VEHICLE (TO KNOW THE POSSIBILITY OF BEING STOLEN) | |
| | ·RADIO COMMUNICATION TO CENTER AND OWNER ·IMAGE TRANSMISSION OF WRECKER | × | ○ | ·RADIO COMMUNI-CATION ·ENCRYPTION | | |
| ·JUDGMENT OF SUSPICIOUS PERSON BY CENTER | ·WARNING BY SIREN AND VOICE ·REPORTING | × | ○ | | | |
| ·UPLIFT JUDGED | ·SIREN AND VOICE | × | ○ | | ·VEHICLE BEING TOWED IS KNOWN | |
| | ·RADIO COMMUNICATION TO CENTER AND OWNER ·IMAGE TRANSMISSION OF WRECKER | × | ○ | ·RADIO COMMUNI-CATION ·ENCRYPTION | | BY MISALIGNMENT OF IMAGES, JACKING-UP IS DETECTED AND THEFT IS DETECTED |
| ·JUDGMENT OF SUSPICIOUS PERSON BY CENTER | ·WARNING BY SIREN AND VOICE ·REPORTING | × | ○ | | | |

[VEHICLE THEFT] (IN CASE OF WRECKER)

○: CAN BE DONE BY ONESELF
△: ACHIEVED BY APPROACH FROM OTHER PARTY (EX. ACHIEVED BY APPROACHES BY CAR AND ROAD SIDE)
×: CANNOT BE ACHIEVED WITHOUT CAR-TO-CAR INFORMATION

○: CAN BE DONE BY ONESELF
△: ACHIEVED BY APPROACH FROM OTHER PARTY (EX. ACHIEVED BY APPROACHES BY CAR AND ROAD SIDE)
×: CANNOT BE ACHIEVED WITHOUT CAR-TO-CAR INFORMATION

| SERVICE FIELD | GOAL | SCENE | FACTOR | CRITICAL CASE | PERCEPTION/ RECOGNITION OF INFORMATION (1) | PERCEPTION/ RECOGNITION OF INFORMATION (2) | POSSIBILITY BY HUMAN | POSSIBILITY BY AUTONOMOUS PROCESS | COMPLEMENT |
|---|---|---|---|---|---|---|---|---|---|
| | | IN TRANSIT | THEFT SUCCEEDED | ·STOLEN CAR IS MOVING | ·MOVING POSITION IS DETECTED | ·TO KNOW THE POSITION | × | ○ | ·POSITIONING (GPS)<br>·RADIO COMMUNICATION<br>·DATABASE |
| | | SOLD | | ·LICENSE PLATE IS REMOVED | ·REMOVAL OF LICENSE PLATE IS DETECTED | ·TO AUTHENTICATE LICENSE PLATE | × | ○ | ·SMART PLATE<br>·PLATE AUTHENTICATION TECHNIQUE |
| | | | | ·PARTS ARE SOLD | ·ILLEGAL USE OF PARTS IS · DETECTED THE USE | ·TO DETECT EQUIPMENT CODE | × | ○ | ·AUTHENTICATION CONTROL ECU |
| | | | | ·EXPORTED | ·REGIONS ARE DETECTED | ·TO DETECT OWN CAR POSITION INFORMATION | × | ○ | ·MUTUAL AUTHENTICATION OF EQUIPMENT<br>·AUTHENTICATION CONTROL ECU<br>·POSITIONING<br>·USE OF OTHER COUNTRIES SUPPRESSED BY REGION CODE |

○ : CAN BE DONE BY ONESELF
× : CANNOT BE DONE BY ONESELF

○ : CAN BE DONE BY ONESELF
× : HOLDS FOR BY ACCUMULATED INFORMATION

| JUDGMENT/ ACTION (1) | JUDGMENT/ ACTION (2) | POSSIBILITY BY HUMAN | POSSIBILITY BY AUTONOMOUS PROCESS | APPLIED TECHNIQUE | JOY | COMPLEMENT |
|---|---|---|---|---|---|---|
| ·OWN CAR POSITION IS TRANSMITTED ·IMAGES OF CRIMINAL AND CRIME COMMITMENT TRANSMITTED | ·RADIO COMMUNICATION TO CENTER AND OWNER | × | ○ | ·RADIO COMMUNICATION | ·LOCATION OF STOLEN CAR IS KNOWN | |
| | ·E/G STOPPED | | | ·ENCRYPTION | ·TRANSFER CAN BE BLOCKED | |
| ·VEHICLE IS REMOTELY CONTROLLED | | | | ·LINKAGE WITH VEHICLE CONTROL | | |
| ·REMOVAL JUDGED | ·HORN ISSUED | × | ○ | ·LINKAGE WITH BODY CONTROL | ·CANNOT BE REUSED EVEN IF STOLEN | |
| ·REPLACEMENT JUDGED | ·VEHICLE ACTION FROZEN | × | ○ | | | |
| ·OUTSIDE OF USE REGION JUDGED | ·EQUIPMENT ACTION FROZEN | × | ○ | | | |

[THEFT OF PARTS]

○: CAN BE DONE BY ONESELF
△: ACHIEVED BY APPROACH FROM OTHER PARTY (EX. ACHIEVED BY APPROACHES BY CAR AND ROAD SIDE)
×: CANNOT BE ACHIEVED WITHOUT CAR-TO-CAR INFORMATION

| SERVICE FIELD | | GOAL | SCENE | FACTOR | CRITICAL CASE | PERCEPTION/ RECOGNITION OF INFORMATION (1) | PERCEPTION/ RECOGNITION OF INFORMATION (2) | POSSIBILITY BY HUMAN |
|---|---|---|---|---|---|---|---|---|
| VEHICLE THEFT | PREVENTION<br>PREDICTION<br>WARNING | | CASING FOR THEFT (APPROACH OF SUSPICIOUS PERSON) | ·PARKING PLACE<br>·SIGNS OF HUMAN PRESENCE<br>·KEY STORAGE | ·DETECTION OF SUSPICIOUS PERSON AND REPORTING AND DEMORALIZING<br>·CAR DIFFICULT TO BE STOLEN<br>·TO ALLOW SUSPICIOUS PERSON TO FEEL PRESENCE OF HUMAN<br>·TO MAKE SUSPICIOUS PERSON BELIEVE THAT COMMITMENT (ATTEMPTED) FAILED | ·TO DETECT PERSON WHO MAKES SUSPICIOUS ACTION BY FREQUENTLY COMING AROUND THE VEHICLE | ·TO DETECT BY APPROACH OF SUBSTANCE (BY RADIO WAVE) | × |
| | | | | | | | ·TO RECOGNIZE HUMAN FACE | × |
| | | | | | | | ·TO DETECT BY SOUND | × |
| | | | | | | | ·TO DETECT BY SMELL | × |
| | | | | | | | ·TO DETECT BY LIGHT AND SHADE | × |
| | | | | | | | ·TO DETECT BY TEMPERATURE | × |
| | | | | | | | ·TO DETECT MOVEMENT OF DOOR KNOB<br>·TO DETECT VIBRATION | × |
| | | | | | | ·TO DETECT CONTACT | | |
| | | | | | | ·TO KNOW ROBBERY AND LOSS OF THE KEY | ·TO LINK KEY WITH OTHER EQUIPMENT (TO DETECT WHEN KEY LEAVES STORAGE PLACE OR OWNER BODY) | × |

○: CAN BE DONE BY ONESELF
△: ACHIEVED BY APPROACH FROM OTHER PARTY (EX. ACHIEVED BY APPROACHES BY CAR AND ROAD SIDE)
×: CANNOT BE ACHIEVED WITHOUT CAR-TO-CAR INFORMATION

○ : CAN BE DONE BY ONESELF
× : CANNOT BE DONE BY ONESELF

○ : CAN BE DONE BY ONESELF
× : HOLDS FOR BY ACCUMULATED INFORMATION

TO FIG. 20

| POSSIBILITY BY AUTONOMOUS PROCESS | APPLIED TECHNIQUE | JUDGMENT/ ACTION (1) | JUDGMENT/ ACTION (2) | POSSIBILITY BY HUMAN | POSSIBILITY BY AUTONOMOUS PROCESS | APPLIED TECHNIQUE | JOY | COMPLEMENT |
|---|---|---|---|---|---|---|---|---|
| ○ | ·UWB (DETECTION OF HUMAN APPROACH: UP TO 2 M) | ·TO JUDGE APPROACH<br>·TO ASSUME AS SUSPICIOUS PERSON | ·TO REPORT (TO CENTER OR OWNER BY CELLULAR PHONE) | × | ○ | ·RECOGNITION ALGORITHM<br>·ALARM | ·VEHICLE IRREGULARITY CAN BE JUDGED FROM A LONG DISTANCE | |
| ○ | ·SURROUNDING<br>·MONITORING CAMERA (NIGHT-VISION: 360°)<br>·IMAGE RECOGNITION (RECOGNITION OF FACE) | (TO RECOGNIZE SAME FACE IN A PLURALITY OF TIMES AND COLLATE WITH CRIMINALS DATA) | ·TO WARN<br>·TO TAKE PICTURE OF FACE | × | ○ | ·RADIO COMMUNICATION | ·FACE OF CRIMINAL CAN BE IDENTIFIED | |
| ○ | ·MICROPHONE (TO DETECT SOUND OF FOOTSTEPS) | ·TO MAKE SUSPICIOUS PERSON FEEL HUMAN PRESENCE | ·TO GENERATE HUMAN FIGURE | × | ○ | | | |
| ○<br>○ | ·SMELL SENSOR (SMELL OF HUMAN)<br>·LIGHT SENSOR (FLASHLIGHT IN THE NIGHTTIME, ETC) | ·TO MAKE SUSPICIOUS PERSON RECOGNIZE IT AS THE CAR DIFFICULT TO STEAL | ·TO MAKE SUSPICIOUS PERSON RECOGNIZE SECURITY ACTION | × | ○ | ·STEREOSCOPIC VISION | ·TO MAKE SUSPICIOUS PERSON ABANDON THE INTENTION TO STEAL (PREVENTION) | |
| ○ | ·IR SENSOR (TO DETECT HUMAN TEMPERATURE) | ·TO DISCOURAGE DESIRE TO STEAL | ·TO MAKE THE CAR INSIDE INVISIBLE | × | ○ | ·PHOTOCHROMIC GLASS (LCD SHUTTER) | | |
| | ·POWER SUPPLY MANAGEMENT (DARK CURRENT CONTROL OF SYSTEM) | ·TO MAKE SUSPICIOUS PERSON BELIEVE HIS COMMITMENT IS FOUND | ·TO SET OFF A FLASH BULB | × | ○ | | | |
| ○ | ·DOOR SW<br>·VIBRATION SENSOR | | | | | | | |
| ○ | ·LINKAGE WITH OTHER EQUIPMENT (LINKAGE WITH CELLULAR PHONE, WRISTWATCH, ETC) | ROBBERY AND LOSS OF THE KEY JUDGED | ·TO ISSUE ALARM<br>·TO REPORT | × | ○ | | ·LOSS OF KEY IS KNOWN | |

FIG.22

[THEFT OF PARTS]

○: CAN BE DONE BY ONESELF
△: ACHIEVED BY APPROACH FROM OTHER PARTY (EX. ACHIEVED BY APPROACHES BY CAR AND ROAD SIDE)
×: CANNOT BE ACHIEVED WITHOUT CAR-TO-CAR INFORMATION

| SERVICE FIELD | GOAL | SCENE | FACTOR | CRITICAL CASE | PERCEPTION/ RECOGNITION OF INFORMATION (1) | PERCEPTION/ RECOGNITION OF INFORMATION (2) | POSSIBILITY BY HUMAN | POSSIBILITY BY AUTONOMOUS PROCESS |
|---|---|---|---|---|---|---|---|---|
| DETECTION<br>ALARM<br>NOTIFICATION IN MEMORY<br>BLOCKING<br>REPULSE | | INTRUSION DETECTED | | •PICKING | •CHANGE OF VEHICLE CONDITION BY PICKING | •VIBRATION<br>•SOUND<br>•IMAGES<br>•PICKING SENSOR | × | ○ |
| | | | | •GLASS BREAKAGE | •DETECTION OF GLASS BREAKAGE | •VIBRATION<br>•SOUND (GLASS BREAKAGE SENSOR)<br>•ATMOSPHERIC PRESSURE | × | ○ |
| | | INTRUSION ATTEMPTED BY STOLEN KEY | •KEY STOLEN | •STOLEN KEY | •ILLEGAL KEY OWNER DETECTED | •PERSONAL AUTHENTICATION OF KEY (FINGER PRINTS, ETC)<br>•PERSONAL AUTHENTICATION BY KEY AND VEHICLE SIDE (OUTSIDE THE VEHICLE) (FACE, IRIS, VOICE, GESTURE)<br>•PERSONAL EQUIPMENT AUTHENTICATION BY KEY AND OTHERS (CELLULAR PHONE, WRISTWATCH, ACCESSORY, ETC) | × | ○ |
| | | INTRUDED IN VEHICLE | •DOOR UNLOCKING SUCCEEDED | | •DETECTION OF INTRUDER | •IMAGE<br>•SOUND<br>•BODY BUILD AND WEIGHT<br>•RADAR | × | ○ |

○: CAN BE DONE BY ONESELF
△: ACHIEVED BY APPROACH FROM OTHER PARTY (EX. ACHIEVED BY APPROACHES BY CAR AND ROAD SIDE)
×: CANNOT BE ACHIEVED WITHOUT CAR-TO-CAR INFORMATION

○ : CAN BE DONE BY ONESELF
× : CANNOT BE DONE BY ONESELF

○ : CAN BE DONE BY ONESELF
× : HOLDS FOR BY ACCUMULATED INFORMATION

| APPLIED TECHNIQUE | JUDGMENT/ ACTION (1) | JUDGMENT/ ACTION (2) | POSSIBILITY BY HUMAN | POSSIBILITY BY AUTONOMOUS PROCESS | APPLIED TECHNIQUE | JOY | COMPLEMENT |
|---|---|---|---|---|---|---|---|
| ·VIBRATION SENSOR<br>·IMAGE RECOGNITION (RECOGNITION OF PICKING MOTION)<br>·PICKING SENSOR (DETECTION OF FOREIGN MATTER IN DOOR CLEARANCE)<br>·VIBRATION SENSOR<br>·ACOUSTIC SENSOR<br>·ATMOSPHERIC PRESSURE SENSOR | · JUDGMENT OF PICKING<br>→WARNING, THREATENING<br>→REPORTING<br>· JUDGMENT OF GLASS BREAKAGE<br>→WARNING, THREATENING<br>→REPORTING | · SIREN, SOUND<br>·RADIO COMMUNICATION TO CENTER AND OWNER<br>· TRANSMISSION OF FACE OF CRIMINAL | ×<br>× | ○<br>○ | ·RADIO COMMUNI-CATION<br>·ENCRYPTION | ·HARM TO VEHICLE CAN BE KNOWN (POSSIBILITY OF THEFT CAN BE KNOWN) | |
| ·BIOLOGICAL AUTHENTICATION<br>·KEY: FINGER-PRINT<br>·VEHICLE: FACE, IRIS<br>·EQUIPMENT AUTHENTICATION: CELLULAR PHONE, WRISTWATCH<br>·CAMERAS OUTSIDE CABIN | · JUDGES OTHER THAN OWNER<br>→VEHICLE IS LOCKED (DOOR DENIES UNLOCKING)<br>→WARNING, THREATENING<br>→REPORTING | · DOOR LOCK<br>· SIREN, SOUND<br>·RADIO COMMUNICATION TO CENTER AND OWNER<br>· TRANSMISSION OF FACE OF CRIMINAL<br>·IMAGE OF CRIMINAL COMMITMENT TRANSMITTED | × | ○ | ·RADIO COMMUNI-CATION<br>·ENCRYPTION | ·CANNOT BE INTRUDED EVEN WHEN KEY IS STOLEN | |
| ·CABIN CAMERA (TAKING PICTURE OF INTRUDER)<br>·IMAGE RECOGNITION (INTRUSION IS CAUGHT BY CHANGE OF IMAGE)<br>·ACOUSTIC SENSOR (NOISE OF INTRUSION)<br>·SEAT POSITION SENSOR (DETECTION BY SEAT ADJUSTMENT OF INTRUDER)<br>·PASSENGER DETECTION SENSOR (JUDGED BY SEAT LOADS)<br>·UWB | · JUDGED AS INTRUSION<br>→VEHICLE IS LOCKED (DOOR DENIES UNLOCKING)<br>→WARNING, THREATENING<br>→REPORTING | | × | ○ | | ·BEING INTRUDED CAN BE KNOWN | |

[THEFT OF PARTS]

○: CAN BE DONE BY ONESELF
△: ACHIEVED BY APPROACH FROM OTHER PARTY (EX. ACHIEVED BY APPROACHES BY CAR AND ROAD SIDE)
×: CANNOT BE ACHIEVED WITHOUT CAR-TO-CAR INFORMATION

○: CAN BE DONE BY ONESELF
△: ACHIEVED BY APPROACH FROM OTHER PARTY (EX. ACHIEVED BY APPROACHES BY CAR AND ROAD SIDE)
×: CANNOT BE ACHIEVED WITHOUT CAR-TO-CAR INFORMATION

| SERVICE FIELD | GOAL | SCENE | FACTOR | CRITICAL CASE | PERCEPTION/ RECOGNITION OF INFORMATION (1) | PERCEPTION/ RECOGNITION OF INFORMATION (2) | POSSIBILITY BY HUMAN | POSSIBILITY BY AUTONOMOUS DISPOSITION | COMPLEMENT |
|---|---|---|---|---|---|---|---|---|---|
| | | JACKING UP | | UPLIFT | ·UPLIFT DETECTED | ·DETECTED BY INCLINATION<br>·DETECTED BY IMAGE<br>·DETECTED BY SOUND | ×<br>×<br>× | ○<br>○<br>○ | ·INCLINATION SENSOR<br>·MOVE OF SCENERY DETECTED BY CAMERA OUTSIDE CABIN<br>·ACOUSTIC SENSOR |
| | | TIRE DEFLATED | | | ·TIRE DEFLATION DETECTED | ·DETECTED BY AIR PRESSURE<br>·DETECTED BY SUSPENSION LENGTH<br>·DETECTED BY SOUND | × | ○ | ·AIR PRESSURE SENSOR<br>·SUSPENSION LENGTH SENSOR<br>·ACOUSTIC SENSOR |
| | | PLACING PEDESTAL UNDER VEHICLE | | | ·PLACING-PEDESTAL-UNDER-VEHICLE DETECTED | ·DETECTED BY SOUND<br>·DETECTED BY VIBRATION | × | ○ | ·ACOUSTIC SENSOR<br>·VIBRATION SENSOR |
| | | TIRE STOLEN | | | ·TIRE REMOVAL DETECTED | ·DETECTED BY SUSPENSION LENGTH<br>·DETECTED BY VIBRATION<br>·DETECTED BY RADIO WAVE | × | ○ | ·SUSPENSION LENGTH SENSOR<br>·VIBRATION SENSOR<br>·RADIO WAVE SENSOR (ANTITHEFT COIL) |
| | | PLATE STOLEN | | | ·LICENSE PLATE THEFT DETECTED | ·NUT POSITION<br>·NUT REMOVAL<br>·DETECTED BY RADIO WAVE | × | ○ | ·SCREW POSITION SENSOR<br>·RADIO WAVE SENSOR |
| | | EQUIPMENT REMOVED | | | ·EQUIPMENT REMOVED | ·NUT POSITION<br>·NUT REMOVAL<br>·DETECTED BY RADIO WAVE | × | ○ | ·SCREW POSITION SENSOR<br>·RADIO WAVE SENSOR |

○ : CAN BE DONE BY ONESELF
× : CANNOT BE DONE BY ONESELF

○ : CAN BE DONE BY ONESELF
× : HOLDS FOR BY ACCUMULATED INFORMATION

| JUDGMENT/ ACTION (1) | JUDGMENT/ ACTION (2) | POSSIBILITY BY HUMAN | POSSIBILITY BY AUTONOMOUS PROCESS | APPLIED TECHNIQUE | JOY | COMPLEMENT |
|---|---|---|---|---|---|---|
| ·UPLIFT JUDGED<br>·JUDGMENT OF SUSPICIOUS PERSON BY CENTER | | ×<br>×<br>× | ○<br>○<br>○ | | ·GOODS BEING STOLEN ARE KNOWN | JACKING UP DETECTED BY CHANGE IN SUSPENSION LENGTH |
| ·TIRE DEFLATION JUDGED | | × | ○ | | | TIRE DEFLATION DETECTED BY CHANGE IN SUSPENSION LENGTH |
| ·PLACING-PEDESTAL-UNDER-VEHICLE JUDGED | | × | ○ | | | |
| ·TIRE REMOVAL JUDGED | | × | ○ | | | ANTITHEFT COIL, ETC INSTALLED TO TIRE, PLATE, ETC AND ALARM IS ISSUED IF TIRE, ETC ARE BROUGHT AWAY FROM VEHICLE |
| ·LICENSE PLATE THEFT JUDGED | | × | ○ | | | LOOSENED SCREW OF LICENSE PLATE IS DETECTED AND THEFT IS DETECTED |
| ·EQUIPMENT REMOVAL JUDGED | | × | ○ | | | |

[THEFT OF PARTS]

○: CAN BE DONE BY ONESELF
△: ACHIEVED BY APPROACH FROM OTHER PARTY (EX. ACHIEVED BY APPROACHES BY CAR AND ROAD SIDE)
×: CANNOT BE ACHIEVED WITHOUT CAR-TO-CAR INFORMATION

| SERVICE FIELD | GOAL | SCENE | FACTOR | CRITICAL CASE | PERCEPTION/ RECOGNITION OF INFORMATION (1) | PERCEPTION/ RECOGNITION OF INFORMATION (2) | POSSIBILITY BY HUMAN | POSSIBILITY BY AUTONOMOUS PROCESS | COMPLEMENT |
|---|---|---|---|---|---|---|---|---|---|
| | | | | ·PARTS SOLD | ·ILLEGAL USE OF PARTS DETECTED | ·TO DETECT EQUIPMENT CODE | × | ○ | ·MUTUAL AUTHENTICATION OF EQUIPMENT |
| | | | | ·EXPORTED | ·USE REGION DETECTED | ·TO DETECT OWN CAR POSITION INFORMATION | × | ○ | ·AUTHENTICATION CONTROL ECU |
| | | | | | | | | | ·POSITIONING |
| | | | | | | | | | ·USE OF OTHER COUNTRIES SUPPRESSED BY REGION CODE |

○ : CAN BE DONE BY ONESELF
× : CANNOT BE DONE BY ONESELF

○ : CAN BE DONE BY ONESELF
× : HOLDS FOR BY ACCUMULATED INFORMATION

| JUDGMENT/ ACTION (1) | JUDGMENT/ ACTION (2) | POSSIBILITY BY HUMAN | POSSIBILITY BY AUTONOMOUS PROCESS | APPLIED TECHNIQUE | JOY | COMPLEMENT |
|---|---|---|---|---|---|---|
| ·REPLACEMENT JUDGED | ·EQUIPMENT ACTION FROZEN | × | ○ | | ·REUSE CAN BE BLOCKED | |
| ·OUTSIDE OF USE REGION JUDGED | ·VEHICLE ACTION FROZEN | × | ○ | | | |

[VANDALIZING]

o: CAN BE DONE BY ONESELF
Δ: ACHIEVED BY APPROACH FROM OTHER PARTY
(EX. ACHIEVED BY APPROACHES BY CAR AND ROAD SIDE)
×: CANNOT BE ACHIEVED WITHOUT CAR-TO-CAR INFORMATION

| SERVICE FIELD | | GOAL | SCENE | FACTOR | CRITICAL CASE | PERCEPTION/ RECOGNITION OF INFORMATION (1) | PERCEPTION/ RECOGNITION OF INFORMATION (2) | POSSIBILITY BY HUMAN |
|---|---|---|---|---|---|---|---|---|
| VEHICLE THEFT | PREVENTION<br>PREDICTION<br>WARNING | | CASING FOR THEFT (APPROACH OF SUSPICIOUS PERSON) | ·PARKING PLACE<br>·SIGNS OF HUMAN PRESENCE<br>·KEY STORAGE | ·DETECTION OF SUSPICIOUS PERSON AND REPORTING AND DEMORALIZING<br>·CAR DIFFICULT TO BE STOLEN<br>·TO ALLOW SUSPICIOUS PERSON TO FEEL PRESENCE OF HUMAN<br>·TO MAKE SUSPICIOUS PERSON BELIEVE THAT COMMITMENT (ATTEMPTED) FAILED | ·TO DETECT PERSON WHO MAKES SUSPICIOUS ACTION BY FREQUENTLY COMING AROUND THE VEHICLE | ·TO DETECT BY APPROACH OF SUBSTANCE (BY RADIO WAVE) | × |
| | | | | | | | ·TO RECOGNIZE HUMAN FACE | × |
| | | | | | | | ·TO DETECT BY SOUND | × |
| | | | | | | | ·TO DETECT BY SMELL | × |
| | | | | | | | ·TO DETECT BY LIGHT AND SHADE | × |
| | | | | | | | ·TO DETECT BY TEMPERATURE | × |
| | | | | | | ·TO DETECT CONTACT | ·TO DETECT MOVEMENT OF DOOR KNOB | × |

○: CAN BE DONE BY ONESELF
△: ACHIEVED BY APPROACH FROM OTHER PARTY
(EX. ACHIEVED BY APPROACHES BY CAR AND ROAD SIDE)
×: CANNOT BE ACHIEVED WITHOUT CAR-TO-CAR INFORMATION

○ : CAN BE DONE BY ONESELF
× : CANNOT BE DONE BY ONESELF

○ : CAN BE DONE BY ONESELF
× : HOLDS FOR BY ACCUMULATED INFORMATION

TO FIG. 28

| POSSIBILITY BY AUTONOMOUS PROCESS | APPLIED TECHNIQUE | JUDGMENT/ ACTION (1) | JUDGMENT/ ACTION (2) | | POSSIBILITY BY AUTONOMOUS PROCESS | APPLIED TECHNIQUE | JOY | COMPLE-MENT |
|---|---|---|---|---|---|---|---|---|
| ○ | ·UWB (DETECTION OF APPROACH OF HUMAN: UP TO 2 M) | ·TO JUDGE APPROACH<br>·TO ASSUME AS SUSPICIOUS PERSON | ·TO REPORT (TO CENTER OR OWNER BY CELLULAR PHONE) | | ○ | ·RECOGNITION ALGORITHM<br>·ALARM<br>·RADIO COMMUNICATION | ·VEHICLE IRREGULARITY CAN BE JUDGED FROM A LONG DISTANCE | |
| ○ | ·SURROUNDING<br>·MONITORING CAMERA (NIGHT-VISION: 360°)<br>·IMAGE RECOGNITION (RECOGNITION OF FACE) | (TO RECOGNIZE SAME FACE IN A PLURALITY OF TIMES AND COLLATE WITH CRIMINALS DATA) | ·TO WARN<br>·TO TAKE PICTURE OF FACE | | × | | ·FACE OF CRIMINAL CAN BE IDENTIFIED | |
| ○ | ·MICROPHONE (TO DETECT SOUND OF FOOTSTEPS) | ·TO MAKE SUSPICIOUS PERSON FEEL HUMAN PRESENCE | ·TO GENERATE HUMAN FIGURE | | ○ | ·STEREOSCOPIC VISION | ·TO BE ABLE TO DISCOURAGE SUSPICIOUS PERSON TO TAMPER | |
| ○ | ·SMELL SENSOR (SMELL OF HUMAN) | ·TO MAKE SUSPICIOUS PERSON RECOGNIZE THE CAR THAT CANNOT BE TAMPERED | ·TO MAKE SUSPICIOUS PERSON RECOGNIZE SECURITY ACTION | | ○ | | | |
| ○ | ·LIGHT SENSOR (FLASHLIGHT IN THE NIGHTTIME, ETC) | | | | | | | |
| ○ | ·IR SENSOR (TO DETECT HUMAN TEMPERATURE)<br>·POWER SUPPLY MANAGEMENT (DARK CURRENT CONTROL OF SYSTEM) | ·TO MAKE SUSPICIOUS PERSON BELIEVE HIS COMMITMENT IS FOUND | | | | | | |
| ○ | ·DOOR SW<br>·VIBRATION SENSOR | | ·TO SET OFF A FLASH BULB | | ○ | | | |

FIG.30

[THEFT OF PARTS]

○: CAN BE DONE BY ONESELF
△: ACHIEVED BY APPROACH FROM OTHER PARTY (EX. ACHIEVED BY APPROACHES BY CAR AND ROAD SIDE)
×: CANNOT BE ACHIEVED WITHOUT CAR-TO-CAR INFORMATION

○: CAN BE DONE BY ONESELF
△: ACHIEVED BY APPROACH FROM OTHER PARTY (EX. ACHIEVED BY APPROACHES BY CAR AND ROAD SIDE)
×: CANNOT BE ACHIEVED WITHOUT CAR-TO-CAR INFORMATION

| SERVICE FIELD | GOAL | SCENE | FACTOR | CRITICAL CASE | PERCEPTION/ RECOGNITION OF INFORMATION (1) | PERCEPTION/ RECOGNITION OF INFORMATION (2) | POSSIBILITY BY HUMAN | POSSIBILITY BY AUTONOMOUS PROCESS | COMPLEMENT |
|---|---|---|---|---|---|---|---|---|---|
| DETECTION<br>ALARM<br>NOTIFICATION IN MEMORY<br>BLOCKING<br>REPULSE | | DAMAGED | | | ·DAMAGE DETECTED | DETECTED BY VIBRATION<br>DETECTED BY SOUND<br>DETECTED BY IMAGE | × | ○ | ·VIBRATION SENSOR<br>·ACOUSTIC SENSOR<br>·ACTION OF DAMAGING DETECTED BY CAMERA OUTSIDE CABIN |
| | | VANDALIZING WITH WIPERS | | | ·VANDALIZING WITH WIPERS DETECTED | DETECTED BY VIBRATION<br>DETECTED BY SOUND<br>DETECTED BY WIPER ANGLE | × | ○ | ·WIPER ANGLE SENSOR |
| | | CHILDREN CLIMBING ON HOOD | | | ·CHILDREN CLIMBING ON HOOD DETECTED | DETECTED BY VIBRATION<br>DETECTED BY SOUND<br>DETECTED BY IMAGE<br>DETECTED BY VEHICLE INCLINATION<br>DETECTED BY SUSPENSION LENGTH | × | ○ | ·VIBRATION SENSOR<br>·ACOUSTIC SENSOR<br>·SCENERY OF CAMERA OUTSIDE CABIN TRANSFER<br>·SUSPENSION LENGTH SENSOR |
| | | ARSON | | | ·ARSON DETECTED | DETECTED BY HEAT<br>DETECTED BY LIGHT<br>DETECTED BY SMOKE<br>DETECTED BY SMELL | × | ○ | ·DETECTION OF HEAT OF FIRE<br>·DETECTION OF LIGHT OF FLAME<br>·SENSING OF SMOKE AND SMELL (FUNCTION AS FIRE ALARM) |
| | | TIRE DEFLATED | | | ·TIRE DEFLATION DETECTED | DETECTED BY AIR PRESSURE<br>DETECTED BY SUSPENSION LENGTH<br>DETECTED BY SOUND | × | ○ | ·AIR PRESSURE SENSOR<br>·SUSPENSION LENGTH SENSOR<br>·ACOUSTIC SENSOR |

○ : CAN BE DONE BY ONESELF
× : CANNOT BE DONE BY ONESELF

○ : CAN BE DONE BY ONESELF
× : HOLDS FOR BY ACCUMULATED INFORMATION

| JUDGMENT/ ACTION (1) | JUDGMENT/ ACTION (2) | POSSIBILITY BY HUMAN | POSSIBILITY BY AUTONOMOUS PROCESS | APPLIED TECHNIQUE | JOY | COMPLEMENT |
|---|---|---|---|---|---|---|
| DAMAGING JUDGED | | × | ○ | ·RADIO COMMUNICATION<br>·ENCRYPTION | ·HARM TO VEHICLE CAN BE KNOWN | |
| WIPER VANDALIZING JUDGED | | | | | | |
| HOOD CLIMBING JUDGED | ·SIREN, VOICE<br>·RADIO COMMUNICATION TO CENTER AND OWNER<br>·FACE OF CRIMINAL TRANSMITTED<br>·IMAGE OF CRIMINAL COMMITMENT TRANSMITTED | | | | | ·CLIMBING OF CHILD, ETC ON HOOD IS DETECTED BY CHANGE OF SUSPENSION LENGTH |
| ARSON JUDGED | | | | | | ·SETTING FIRE TO VEHICLE IS DETECTED AND DAMAGE IS KEPT TO MINIMUM |
| AIR DEFLATION JUDGED | | | | | | |

VEHICLE ANTI THEFT SYSTEM, VEHICLE ANTI THEFT METHOD, AND COMPUTER PROGRAM

BACKGROUND OF THE INVENTION

1) Field of the Invention

The present invention relates to a technology for protecting a vehicle from theft.

2) Description of the Related Art

A conventional vehicle anti theft system keeps a vehicle from theft by locking the engine of the vehicle using an immobilizer, as disclosed in, for example, Japanese Patent Application Laid-Open No. 2002-257013.

However, the vehicle anti theft system disclosed is merely a preventive measure against a specified theft and cannot handle various kinds of theft including theft of the vehicle itself, theft of constituent parts, and vandalizing of the vehicle.

Various kinds of vehicle anti theft systems should be equipped to take all possible measures to protect a vehicle from all kinds of vehicle damage, which is unrealistic and troublesome to operate all the systems. Another problem is that it cannot cover a new kind of vehicle damage.

In addition, when various kinds of vehicle anti theft systems are equipped, all the systems should be kept on running because they are not under a central control, resulting in consumption of a large amount of current. After all, a user selectively runs the minimum required vehicle anti theft systems manually, which is unable to securely protect the vehicle from theft.

In recent years, vehicle damage including vehicle theft tends to increase and theft techniques become advanced and sophisticated. A vehicle anti theft technology that largely surpasses the various acts of vehicle damage is highly requested than ever before.

SUMMARY OF THE INVENTION

It is an object of the present invention to solve at least the problems in the conventional technology.

The theft-deterrent system for a vehicle, according to one aspect of the present invention includes at least one detecting unit that detects information on damage of the vehicle including vehicle theft or vandalizing of the vehicle; at least one prevention unit that executes a preventive measure against the damage; a situation identifying unit that identifies a situation of the damage based on order of detection of the information; a degree-of-danger judging unit that judges a degree of danger based on the situation; and a theft-deterrent control unit that selects and controls the at least one prevention unit corresponding to the degree of danger to execute the preventive measure against the damage.

The theft-deterrent method for a vehicle, according to another aspect of the present invention includes detecting information on damage of the vehicle including vehicle theft or vandalizing of the vehicle; identifying a situation of the damage based on order of detection of the information; judging a degree of danger based on the situation; selecting a preventive measure corresponding to the degree of danger; and executing the preventive measure against the damage.

The computer program for theft deterrent of a vehicle, according to still another aspect of the present invention realizes the method according to the above aspect on a computer.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 3 is a table for explaining main cases of vehicle damage;

FIG. 4 is a schematic for illustrating specific examples of theft-deterrent control and theft recapturing control;

FIG. 5 is a table for explaining an example of correspondence between situation and sensor actuator;

FIG. 6 is a table for explaining vehicle damage prevention against vehicle theft in case of ride away (first part);

FIG. 7 is a table for explaining vehicle damage prevention against vehicle theft in case of ride away (second part);

FIG. 8 is a table for explaining vehicle damage prevention against vehicle theft in case of ride away (third part);

FIG. 9 is a table for explaining vehicle damage prevention against vehicle theft in case of ride away (fourth part);

FIG. 10 is a table for explaining vehicle damage prevention against vehicle theft in case of ride away (fifth part);

FIG. 11 is a table for explaining vehicle damage prevention against vehicle theft in -case of ride away (sixth part);

FIG. 12 is a table for explaining vehicle damage prevention against vehicle theft in case of ride away (seventh part);

FIG. 13 is a table for explaining vehicle damage prevention against vehicle theft in case of ride away (eighth part);

FIG. 14 is a table for explaining vehicle damage prevention against vehicle theft in case of wrecker (first part);

FIG. 15 is a table for explaining vehicle damage prevention against vehicle theft in case of wrecker (second part);

FIG. 16 is a table for explaining vehicle damage prevention against vehicle theft in case of wrecker (third part);

FIG. 17 is a table for explaining vehicle damage prevention against vehicle theft in case of wrecker (fourth part);

FIG. 18 is a table for explaining vehicle damage prevention against vehicle theft in case of wrecker (fifth part);

FIG. 19 is a table for explaining vehicle damage prevention against vehicle theft in case of wrecker (sixth part);

FIG. 20 is a table, for explaining vehicle damage prevention against vehicle theft in case of parts theft (first part);

FIG. 21 is a table for explaining vehicle damage prevention against vehicle theft in case of parts theft (second part);

FIG. 22 is a table for explaining vehicle damage prevention against vehicle theft in case of parts theft (third part);

FIG. 23 is a table for explaining vehicle damage prevention against vehicle theft in case of parts theft (fourth part);

FIG. 24 is a table for explaining vehicle damage prevention against vehicle theft in case of parts theft (fifth part);

FIG. 25 is a table for explaining vehicle damage prevention against vehicle theft in case of parts theft (sixth part);

FIG. 26 is a table for explaining vehicle damage prevention against vehicle theft in case of parts theft (seventh part);

FIG. 27 is a table for explaining vehicle damage prevention against vehicle theft in case of parts theft (eighth part);

FIG. 28 is a table for explaining vehicle damage prevention against vehicle theft in case of vandalizing (first part);

FIG. 29 is a table for explaining vehicle damage prevention against vehicle theft in case of vandalizing (second part);

FIG. 30 is a table for explaining vehicle damage prevention against vehicle theft in case of vandalizing (third part);

FIG. 31 is a table for explaining vehicle damage prevention against vehicle theft in case of vandalizing (fourth part);

DETAILED DESCRIPTION

Exemplary embodiments of a vehicle anti theft system, a vehicle anti theft method, and a computer program, according to the present invention are described in detail with reference to the accompanying drawings.

Figure 32:
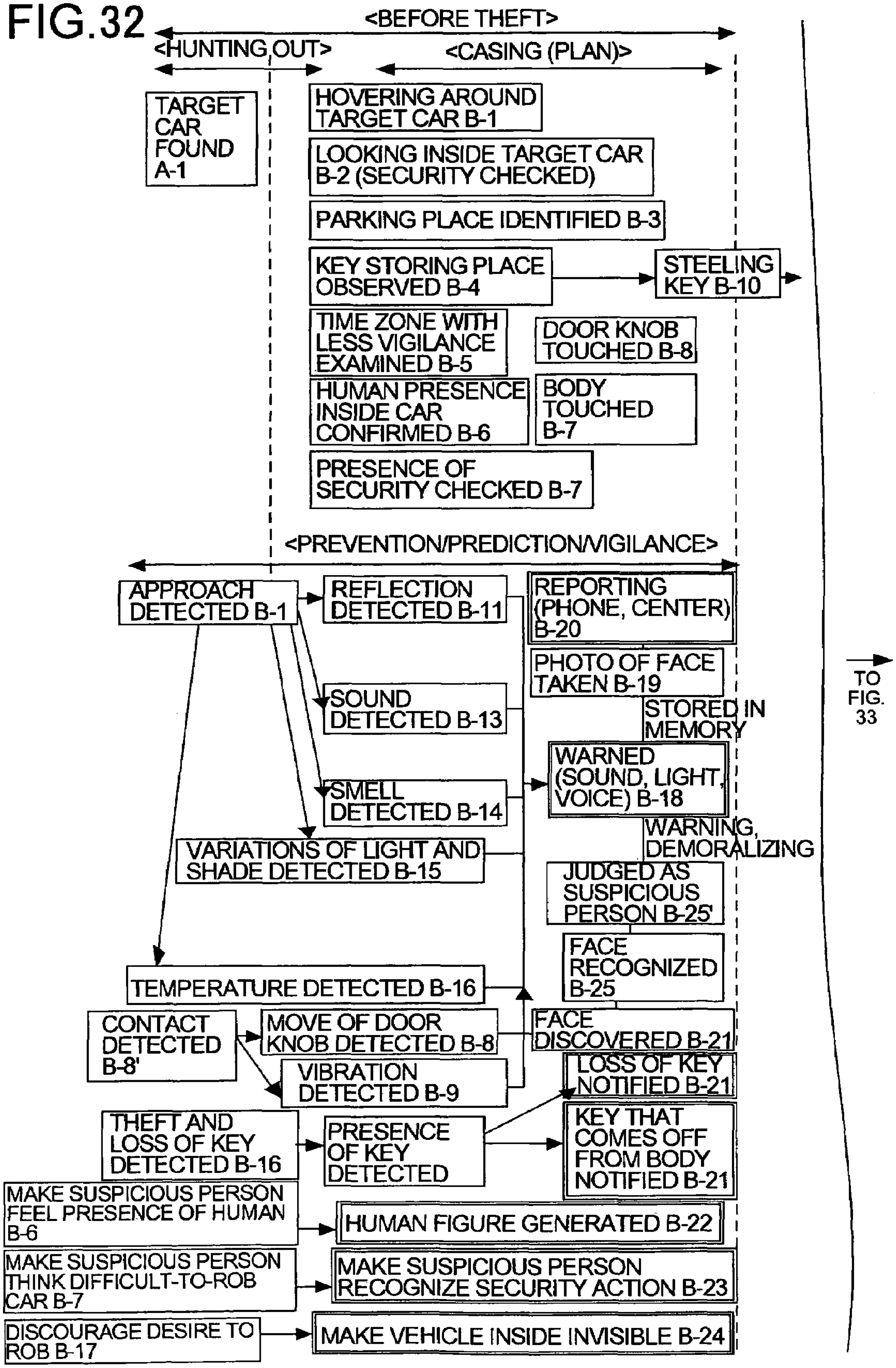
FIG. 32 is a schematic for explaining a relation between actions of a vehicle thief and vehicle damage prevention against the actions in case of ride-away (first part)
Figure 33:
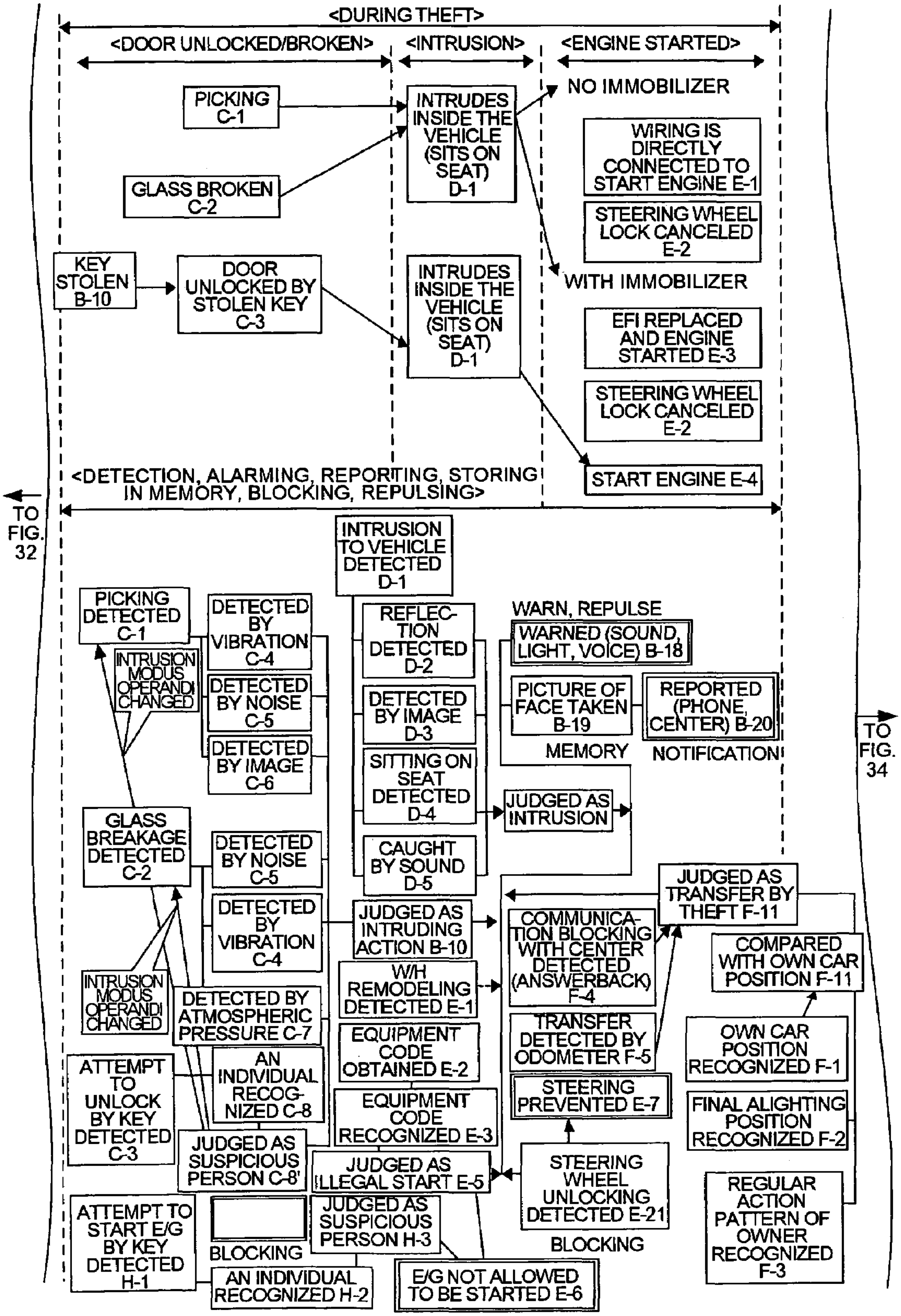
FIG. 33 is a schematic for explaining a relation between actions of a vehicle thief and vehicle damage prevention against the actions in case of ride-away (second part)
Figure 34:
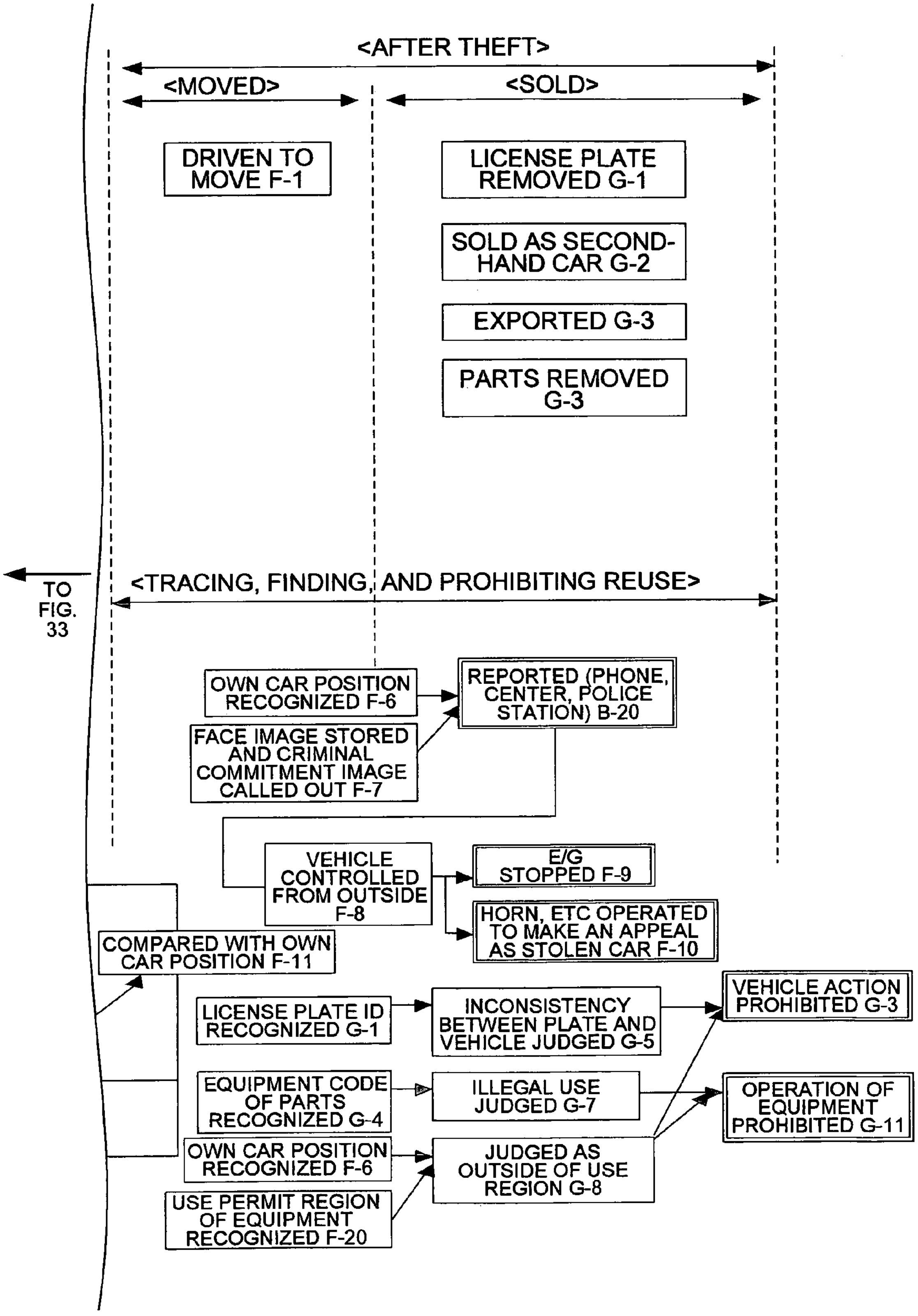
FIG. 34 is a schematic for explaining a relation between actions of a vehicle thief and vehicle damage prevention against the actions in case of ride-away (third part)
Figure 35:
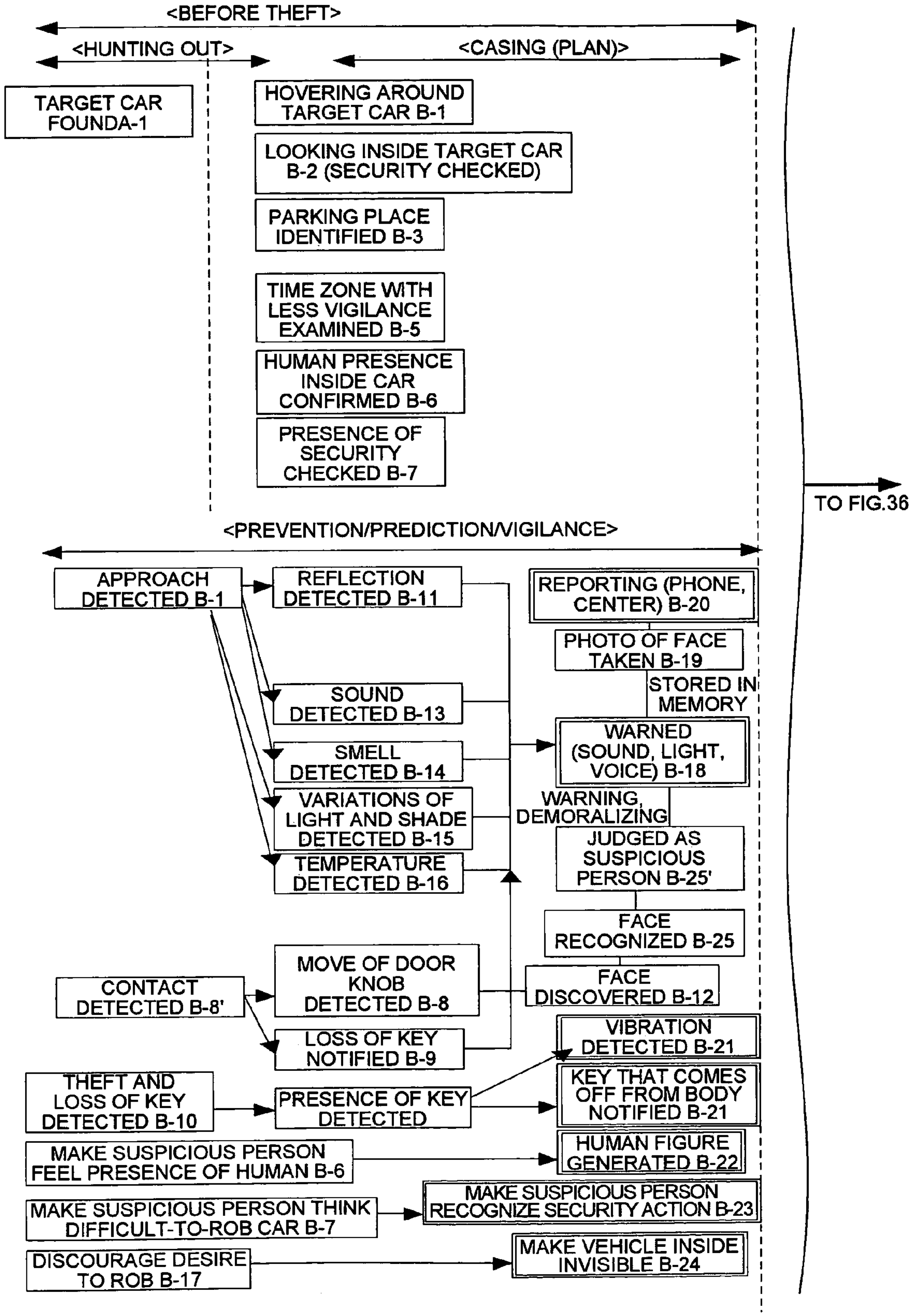
FIG. 35 is a schematic for explaining a relation between actions of vehicle thief and vehicle damage prevention against the actions in case of wrecker (first part)
Figure 36:
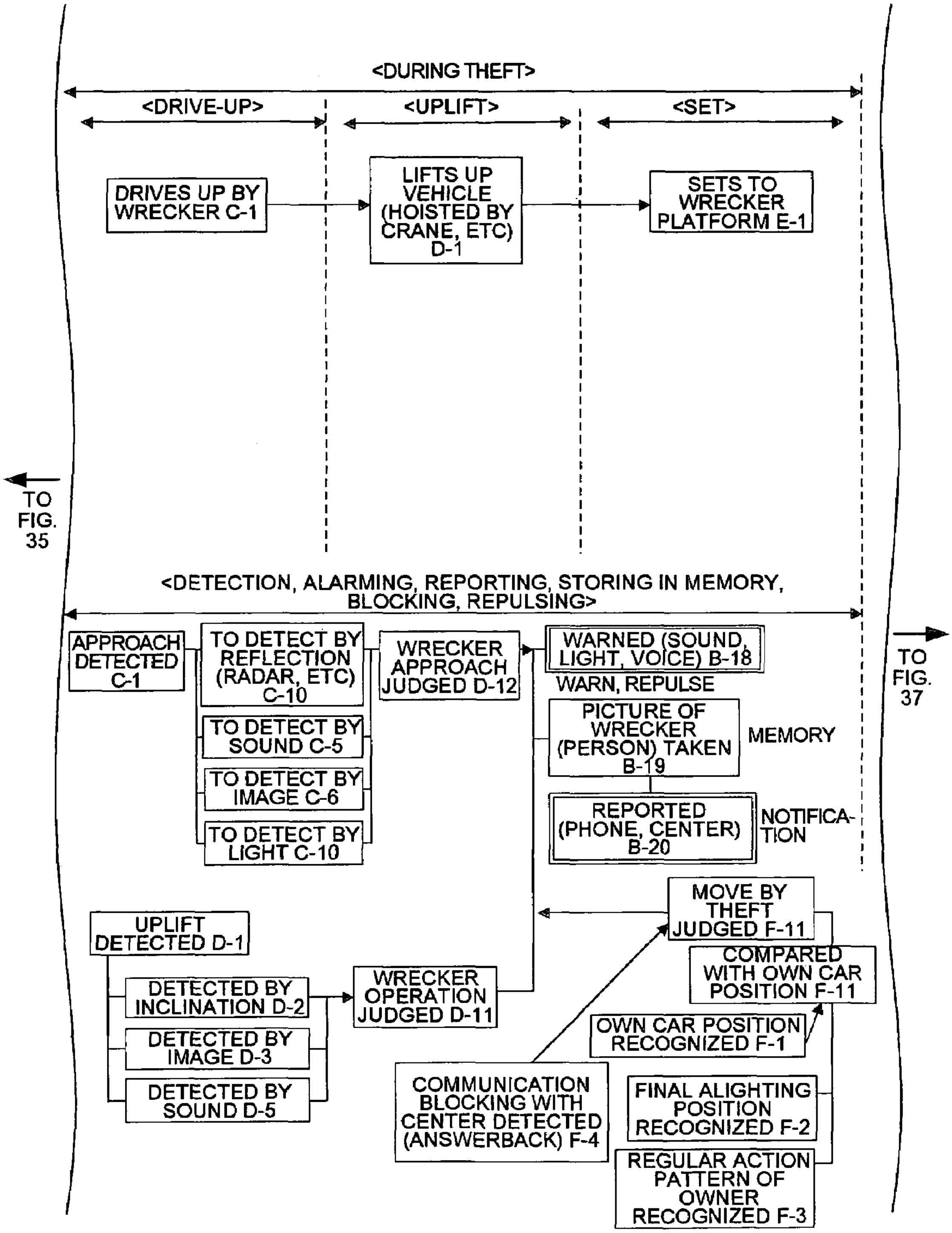
FIG. 36 is a schematic for explaining a relation between actions of vehicle thief and vehicle damage prevention against the actions in case of wrecker (second part)
Figure 37:
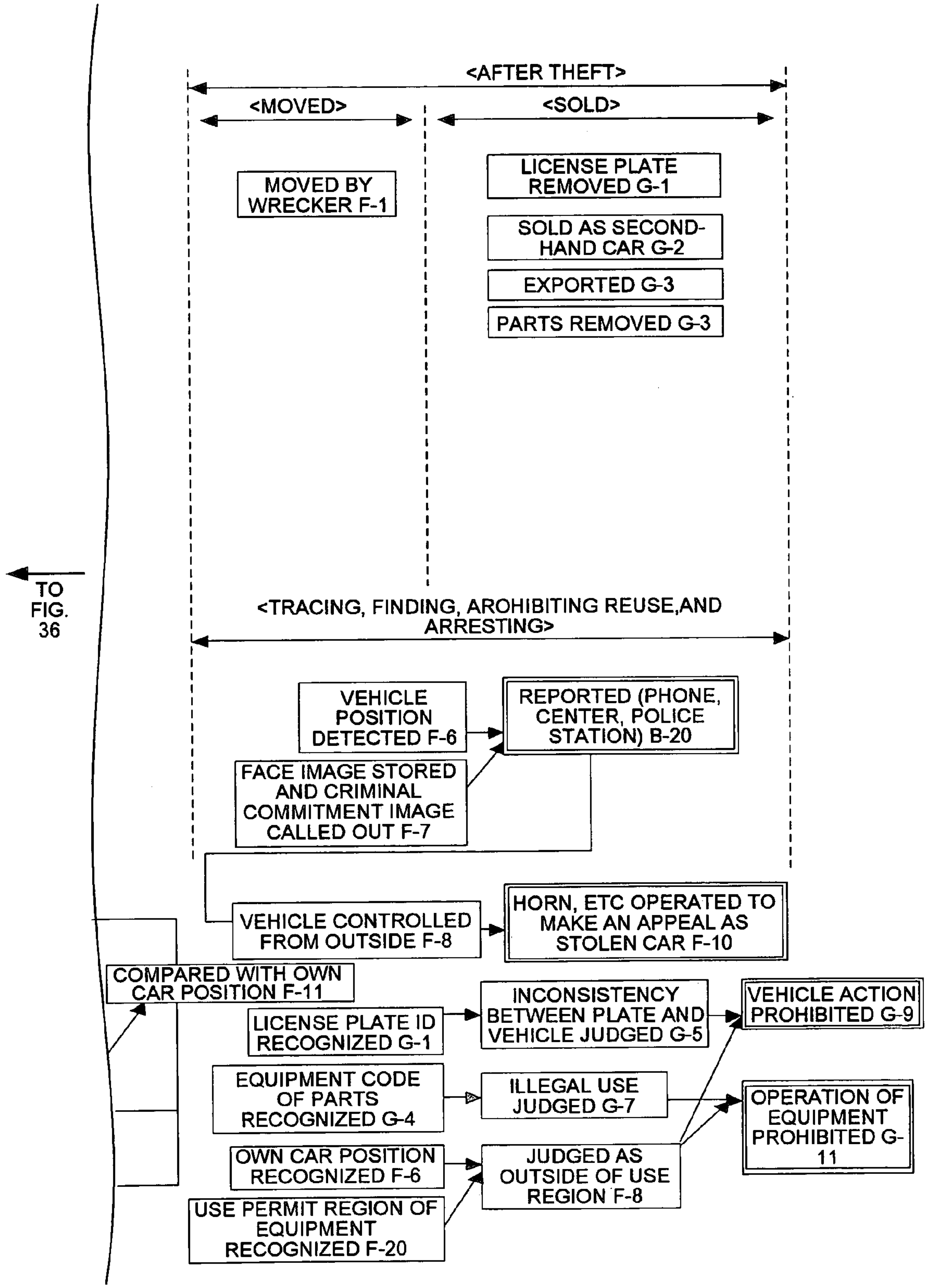
FIG. 37 is a schematic for explaining a relation between actions of vehicle thief and vehicle damage prevention against the actions in case of wrecker (third part)
Figure 38:
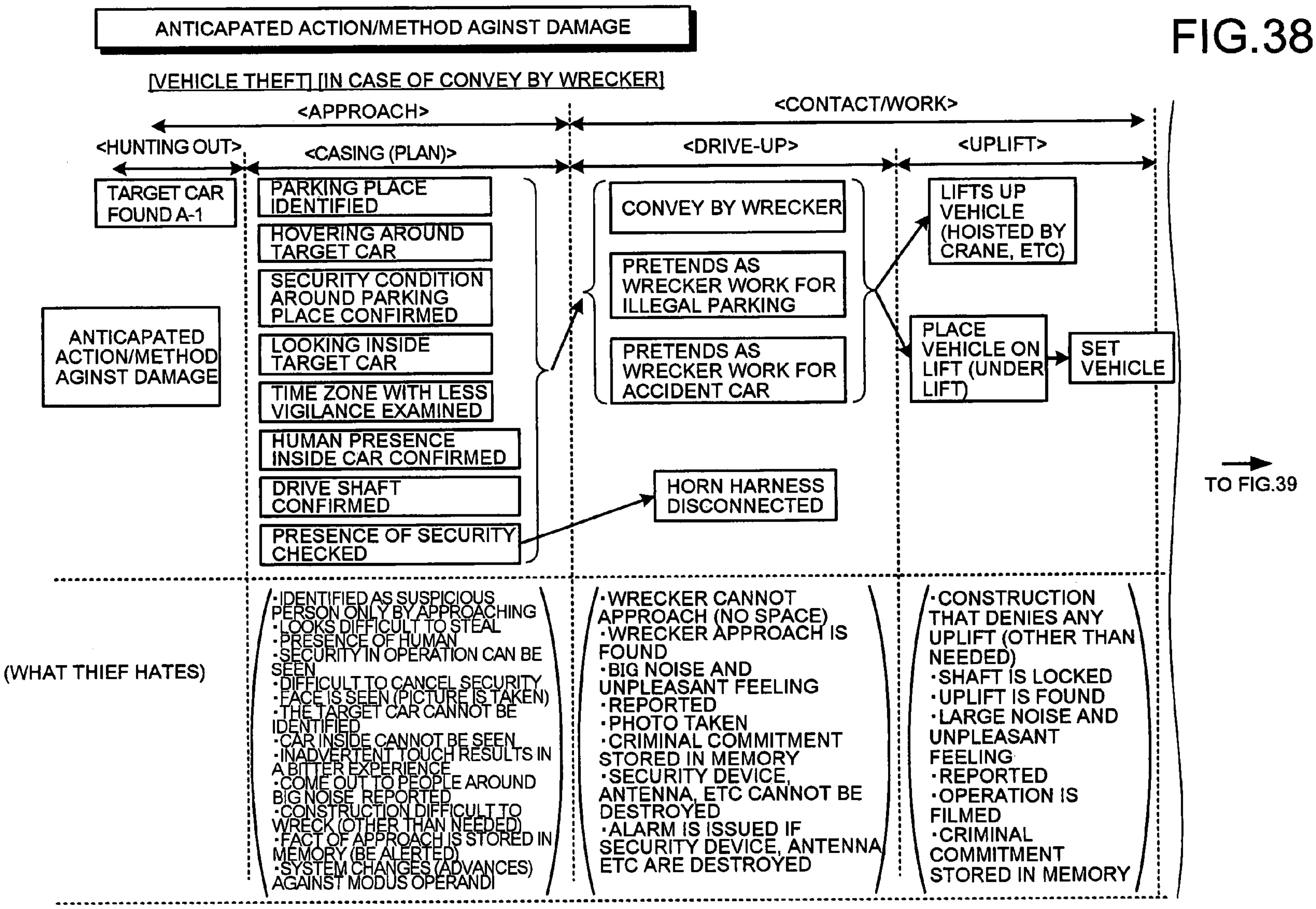
FIG. 38 is a schematic for explaining action patterns of a vehicle thief when the vehicle is conveyed by a wrecker and measures against the theft (first part)
Figure 39:
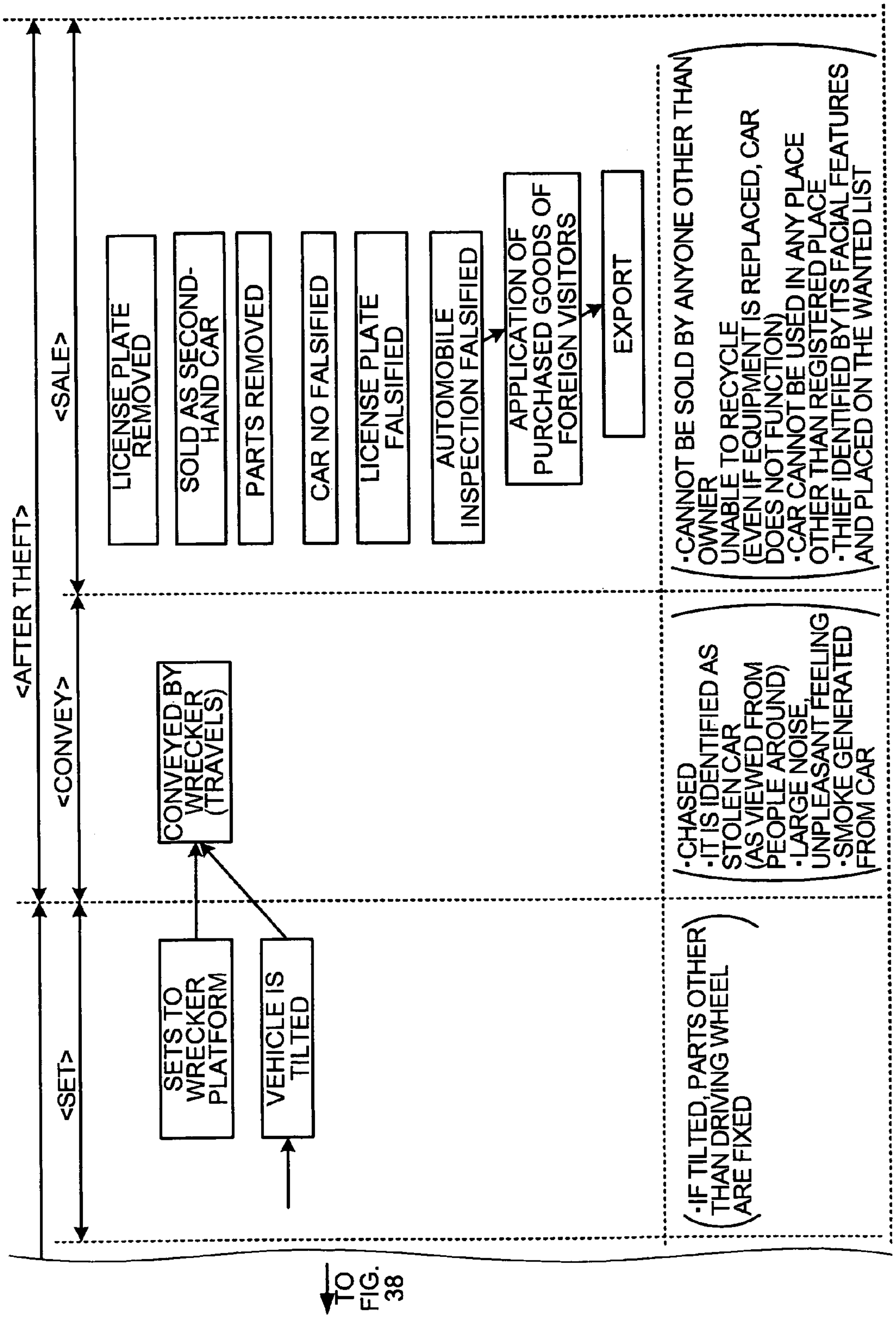
FIG. 39 is a schematic for explaining action patterns of a vehicle thief when the vehicle is conveyed by a wrecker and measures against the theft (second part)
Figure 40:
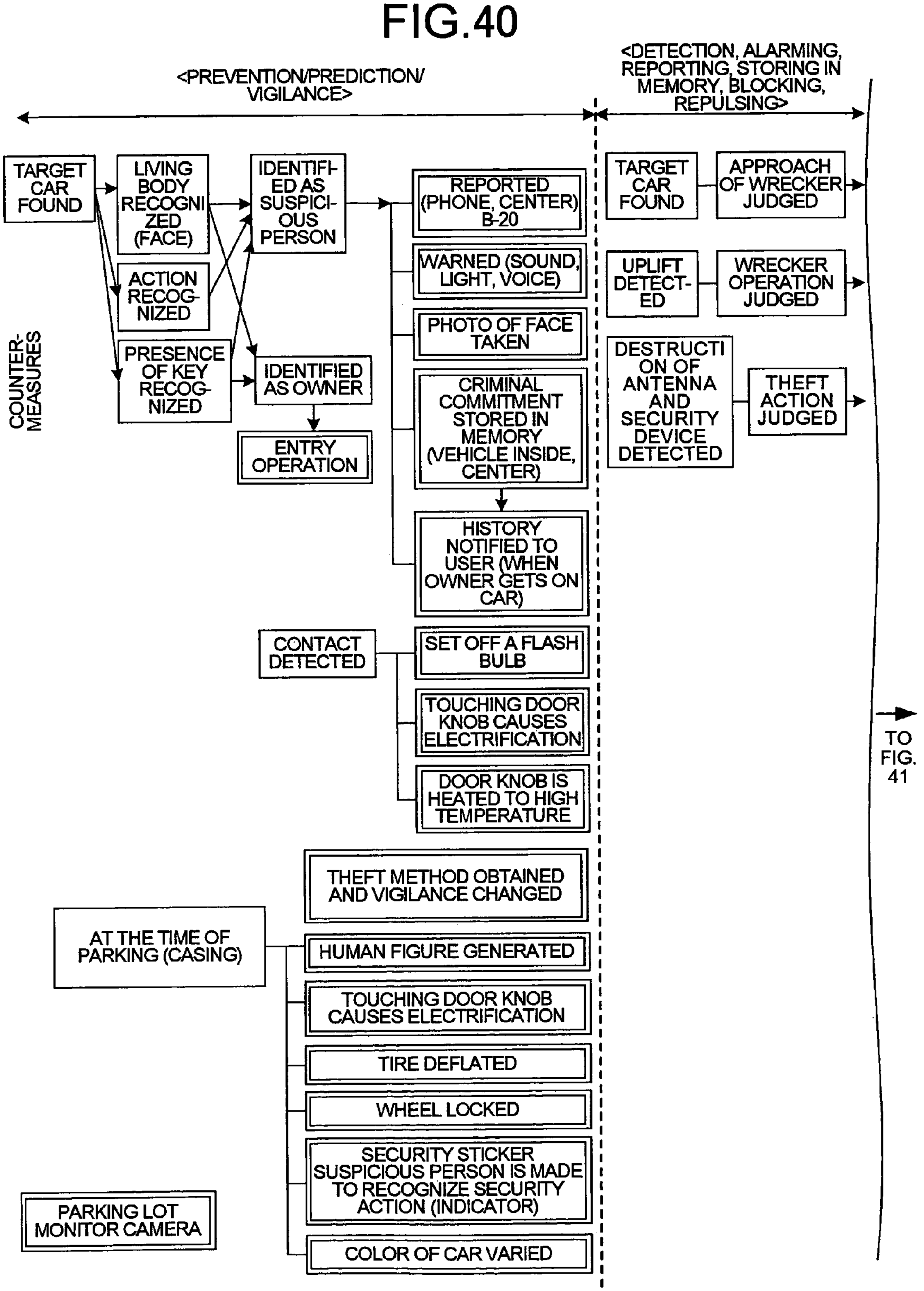
FIG. 40 is a schematic for explaining action patterns of a vehicle thief when the vehicle is conveyed by a wrecker and measures against the theft (third part)
Figure 41:
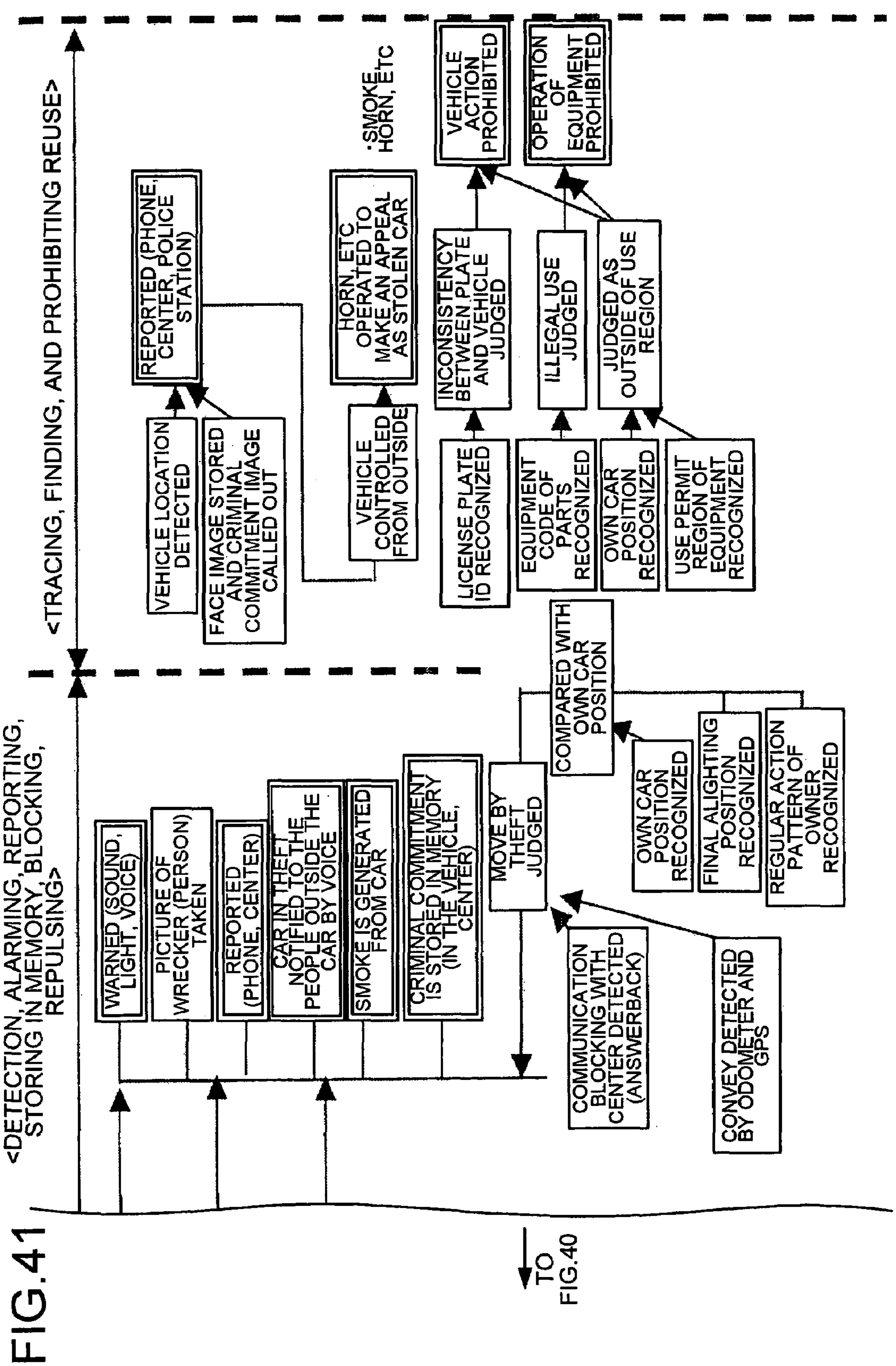
FIG. 41 is a schematic for explaining action patterns of a vehicle thief when the vehicle is conveyed by a wrecker and measures against the theft (fourth part)
Figure 42:
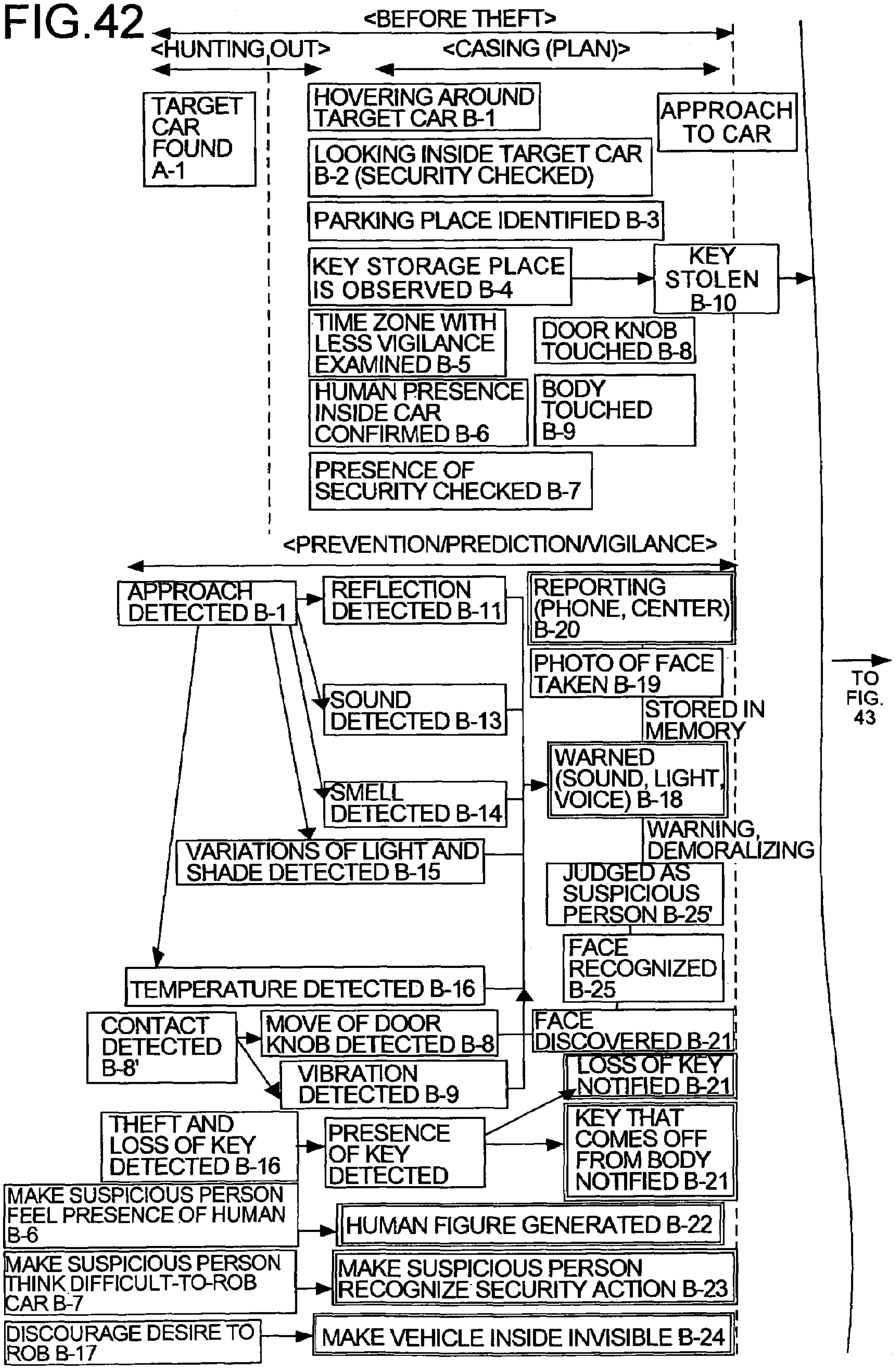
FIG. 42 is a schematic for explaining a relation between actions of vehicle thief and vehicle damage prevention against the actions in case of parts theft (first part)
Figure 43:
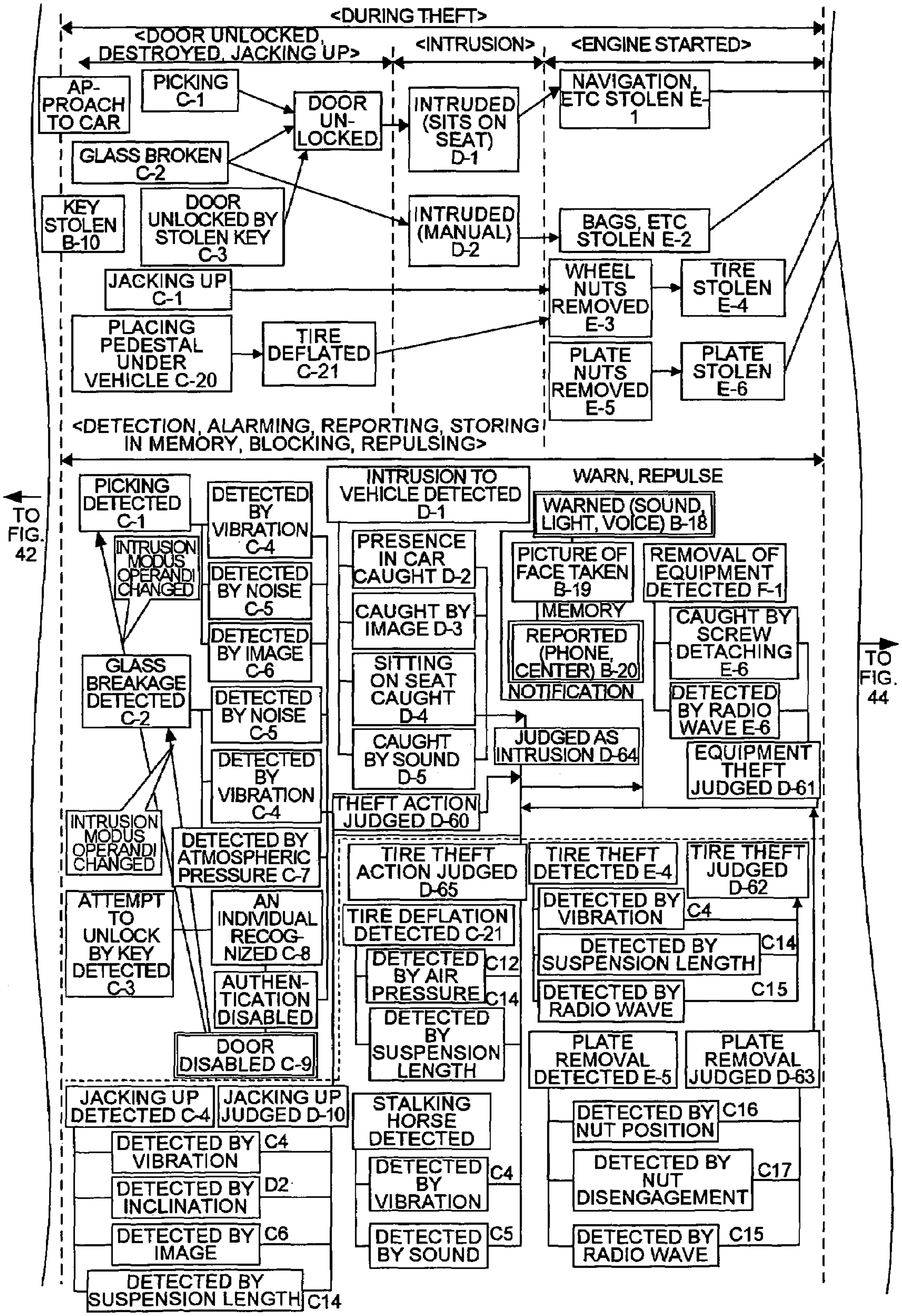
FIG. 43 is a schematic for explaining a relation between actions of vehicle thief and vehicle damage prevention against the actions in case of parts theft (second part)
Figure 44:
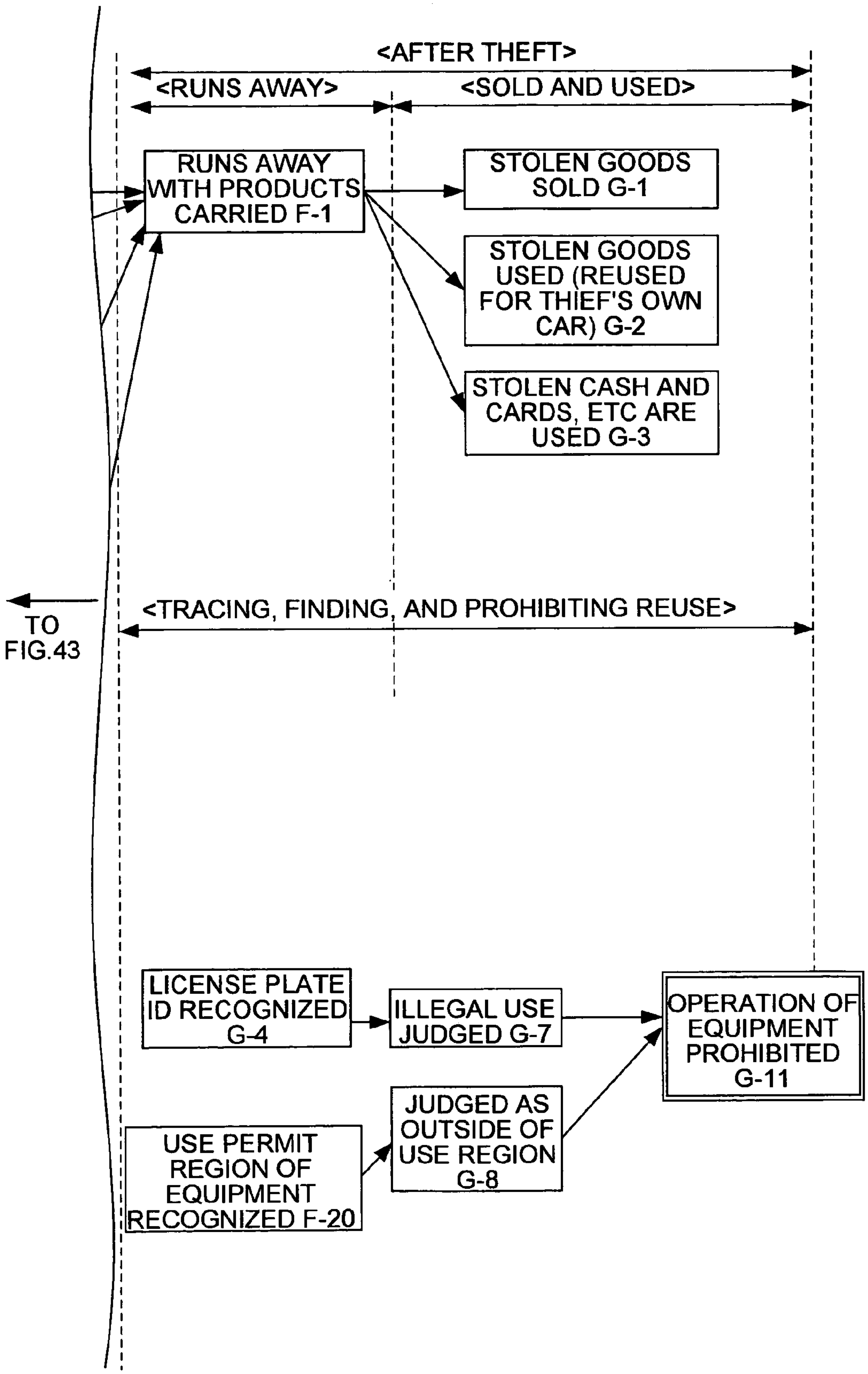
FIG. 44 is a schematic for explaining a relation between actions of vehicle thief and vehicle damage prevention against the actions in case of parts theft (third part)
Figure 45:
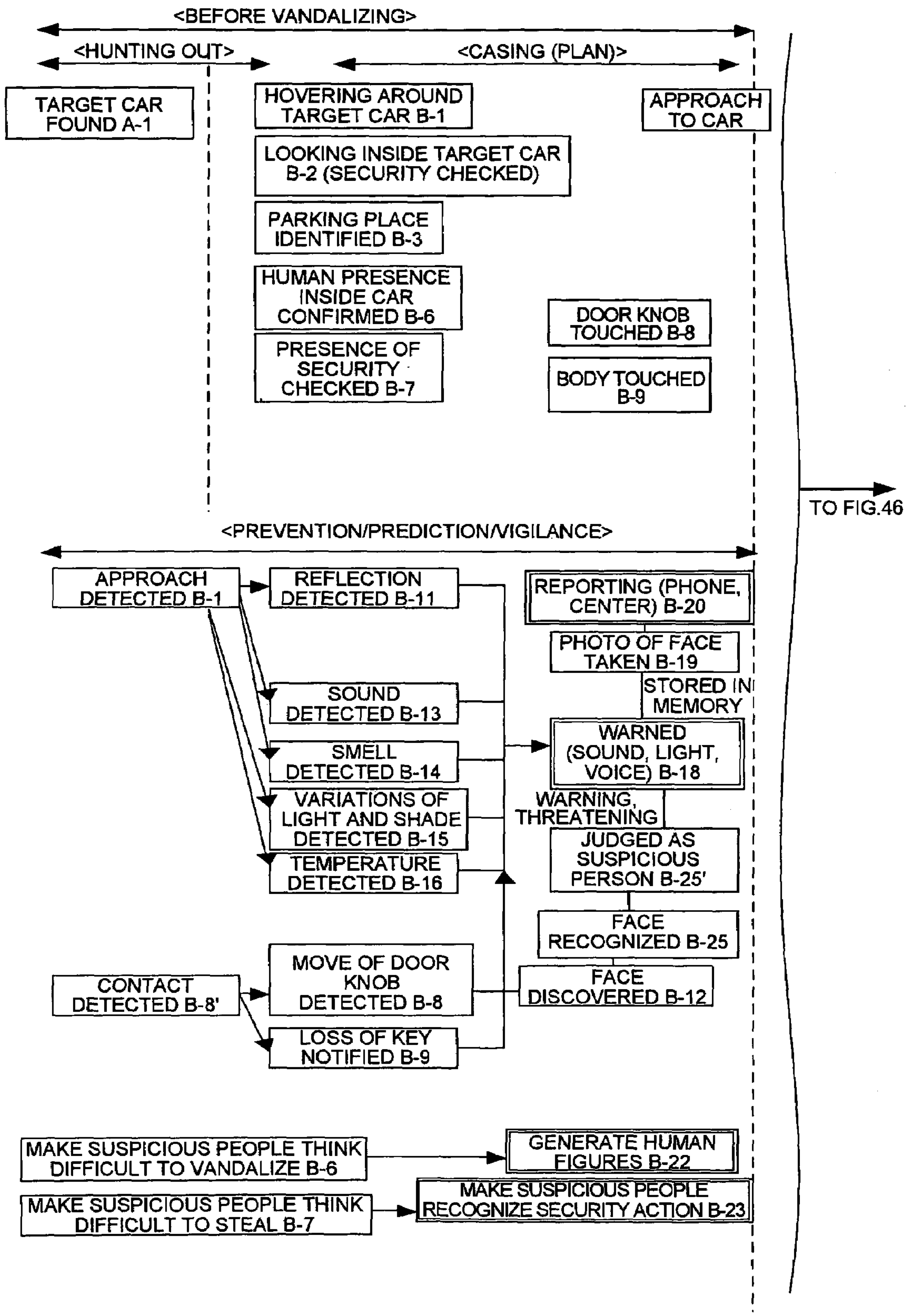
FIG. 45 is a schematic for explaining a relation between actions of a vandalizer and vehicle damage prevention against the actions (first part)
Figure 46:
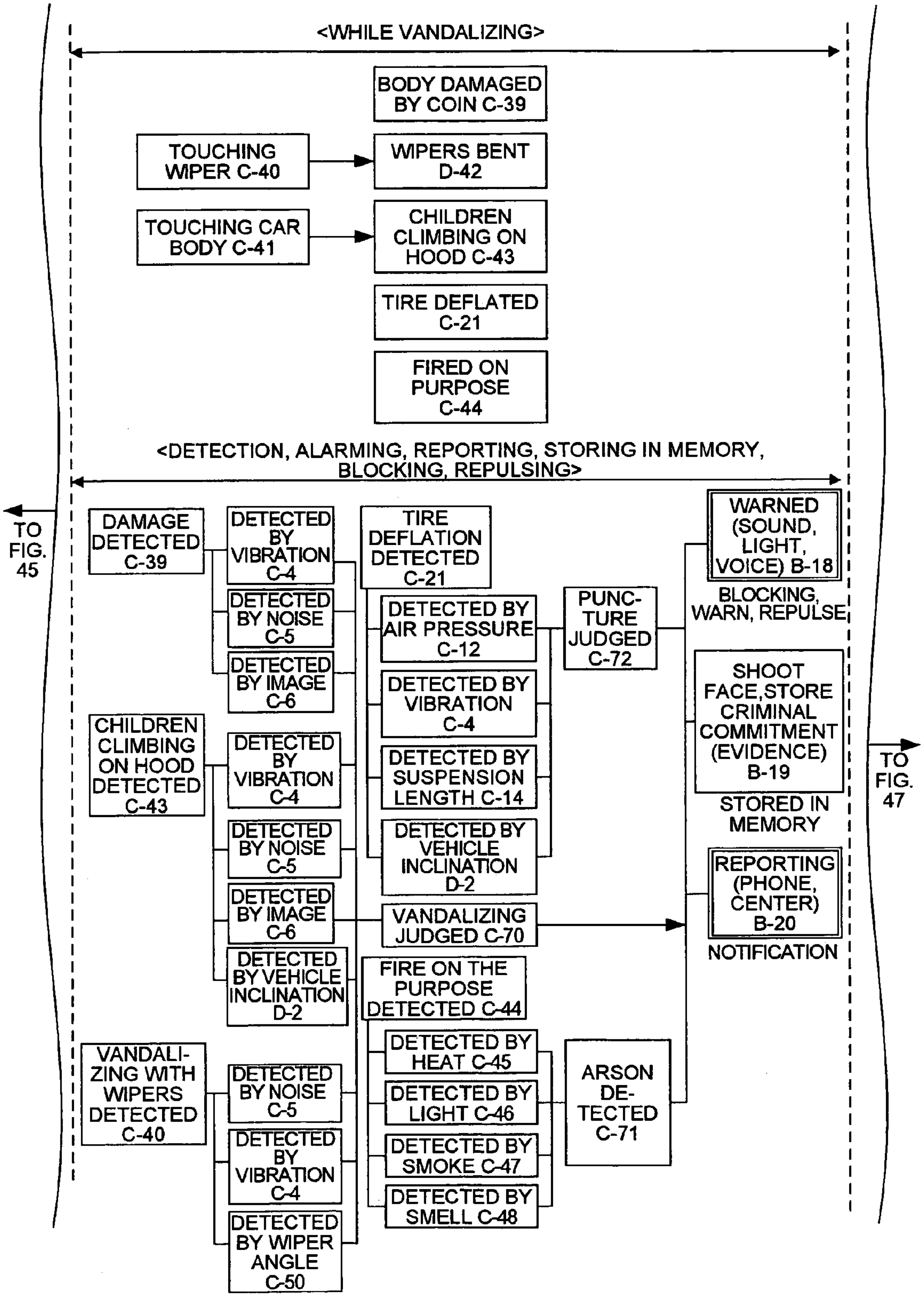
FIG. 46 is a schematic for explaining a relation between actions of a vandalizer and vehicle damage prevention against the actions (second part)
Figure 47:
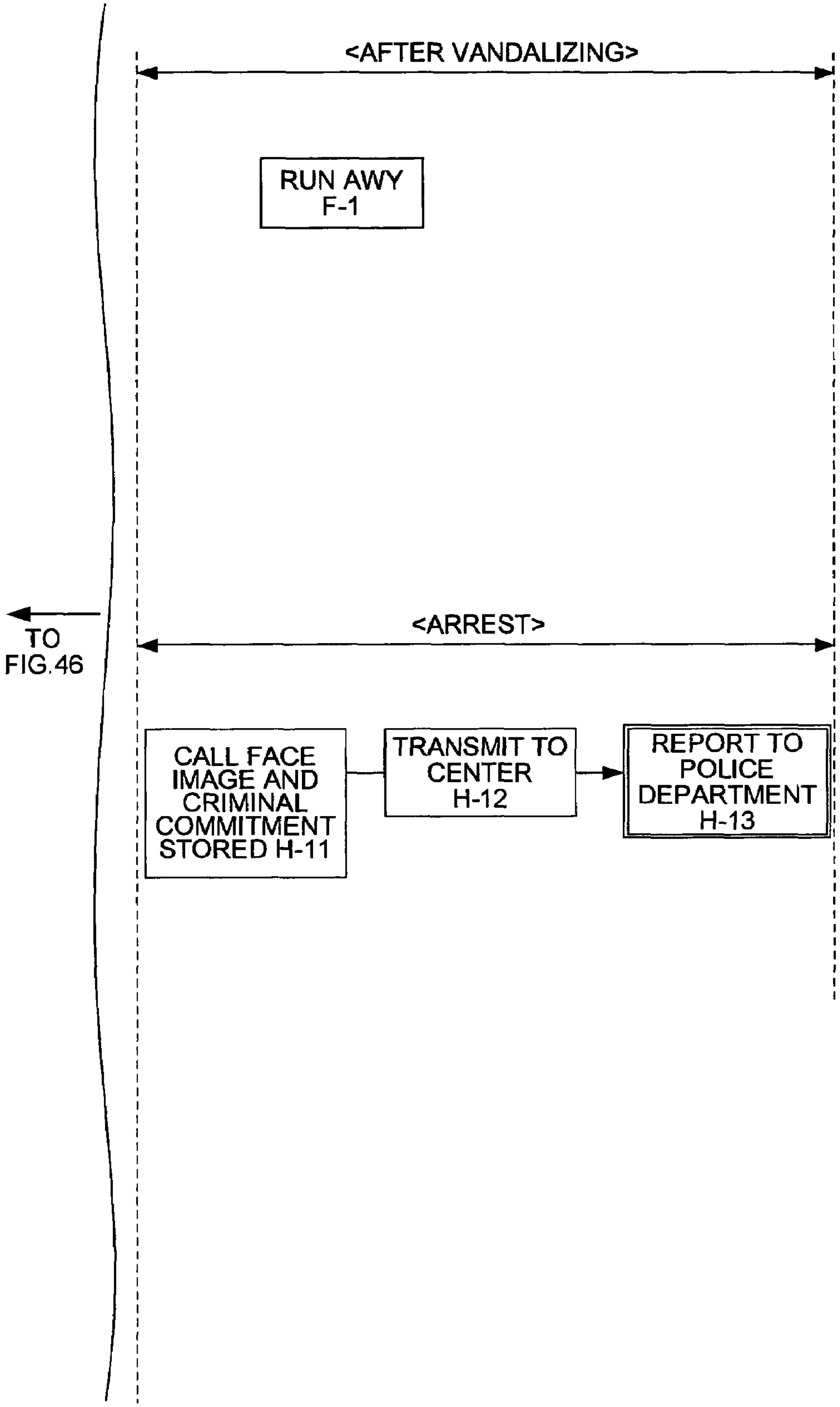
FIG. 47 is a schematic for explaining a relation between actions of a vandalizer and vehicle damage prevention against the actions (third part).

First of all, referring to FIG. 5 through FIG. 47, the basic idea of the embodiments of the present invention is explained. FIG. 5 is a table for explaining main scenes of vehicle damage including vehicle theft. FIG. 6 through FIG. 13 are tables for explaining damage prevention against vehicle theft incase of ride-away; FIG. 14 through FIG. 19 are tables for explaining damage prevention against vehicle theft in case of wrecker; FIG. 20 through FIG. 27 are tables for explaining damage prevention against parts robbery; and FIG. 28 through FIG. 31 are tables for explaining damage prevention against vehicle theft in case of vandalizing. FIG. 32 through FIG. 34 are schematics for explaining actions of a vehicle thief and vehicle damage prevention against the actions in case of ride-away; FIG. 35 through FIG. 37 are schematics for explaining actions of a vehicle thief and vehicle damage prevention against the actions in case of wrecker; FIG. 38 through FIG. 41 are schematics for explaining action patterns of a vehicle thief when the vehicle is conveyed by a wrecker and measures against the theft; FIG. 42 through FIG. 44 are schematics for explaining actions of a vehicle thief and vehicle damage prevention against the actions in case of parts theft; and FIG. 45 through FIG. 47 are schematics for explaining actions of a vandalizer and vehicle damage prevention against the actions.

The ultimate goal of the embodiments according to the present invention is to prevent vehicle damage in general of vehicle theft including parts robbery, vandalizing, and others. The vehicle damage can be generally classified into vehicle theft by ride-away, vehicle theft by wrecker, parts robbery, and vandalizing. In vehicle theft by ride-away, for example, scenes such as "casing for theft", "intrusion into vehicle", "attempt to start engine", "stolen vehicle is moved", "stolen vehicle is sold", etc. exist in chronological order of theft. And these scenes take place by various factors. For example, in case of the vehicle theft by ride-away, the factors include "parking place", "human presence", "key storage", "key stolen", "successful intrusion", "parts replacement", "successful theft", etc. The "critical cases" indicates points to be focused on corresponding to each scene, for example, "vehicle difficult to be stolen", "suspicious person is found and reported or demoralized", "signs of human presence are felt, making the thief to believe that its offense is detected", "picking", "glass breaking", "attempt to intrude with the stolen key", "directly connected wire harness", "FEI replacement", "engine start by stolen key", "vehicle travels where the owner does not usually go", "stolen vehicle is moved", "license plate removed", "parts sold", and "exported".

Therefore, it is essential how to standardize, save energy, and prevent vehicle damage definitely with respect to the theft factors in each scene. The methods of solving such problems are the basic idea of the present embodiments. That is, methods of actualizing prevention, prediction, and vigilance before theft, detection, warning, reporting, storing in memory, blocking, and repulse during theft, and tracing, discovery, and prohibition of reuse after theft in each of vehicle damage shown in FIG. 6 though FIG. 47 are basics of the present embodiments.

The "perception/recognition of information" and "judgment/action" indicate the content that must be perceived/recognized in each scene and the content to be judged/acted on the basis of the content perceived/recognized, respectively. The "applied techniques" and "complements" indicate actualization techniques how to perceive/recognize and an actualization techniques how to judge/act, respectively. That is, in the scene of "casing for theft" in ride-away vehicle theft shown in FIG. 6 and FIG. 7, when detecting a person who makes suspicious action by frequently coming around the vehicle, the theft-deterrent system carries out actions of judging approach of a person by using an ultra wideband (UWB) radar and reports and alarms the control center or vehicle owner, etc., to prevent vehicle theft.

In tables of FIG. 32 through FIG. 47, the process procedures of the upper layer of each figure indicate the content and the flow a vehicle thief or a vandalizer carries out before theft, during theft, and after theft. The thief or vandalizer hunts out and carries out casing before theft, unlock and destroys a door, intrudes the vehicle, and starts the engine during theft, and moves and sells the vehicle after theft. In addition, the process procedures of the lower layer of each figure indicate the content and the flow of prevention, prediction, and vigilance before theft, detection, alarming, reporting, storing in memory, blocking, and repulse during theft, and tracing, discovery, and prohibition of reuse after theft. For example, in the cases shown in FIG. 32 to FIG. 34, "vehicle theft" is classified in time-series modes before theft, during theft, and after theft. During theft, theft prevention to detect picking and prevent a door from being unlocked is performed.

As described above, techniques of realizing prevention, prediction, and vigilance before theft, detection, alarming, reporting, storing in memory, blocking, and repulse during theft, and tracing, discovery, and prohibition of reuse after theft are proposed for each vehicle damage, and each of the techniques constitutes a basic idea of the embodiments of the present invention to prevent vehicle damage including vehicle theft.

Figure 1:
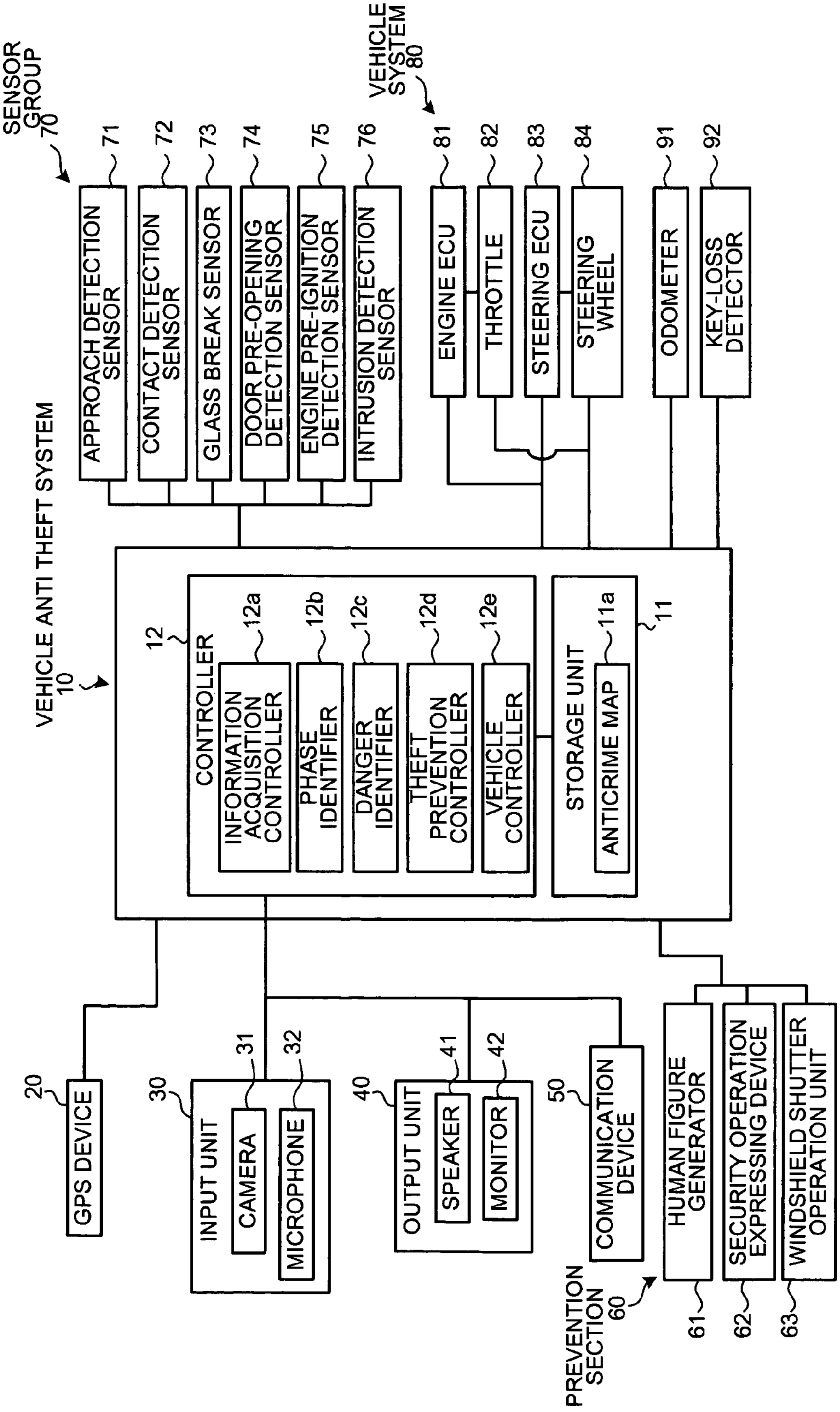
FIG. 1 is a block diagram of a vehicle anti theft system according to an embodiment of the present invention.
Figure 2:
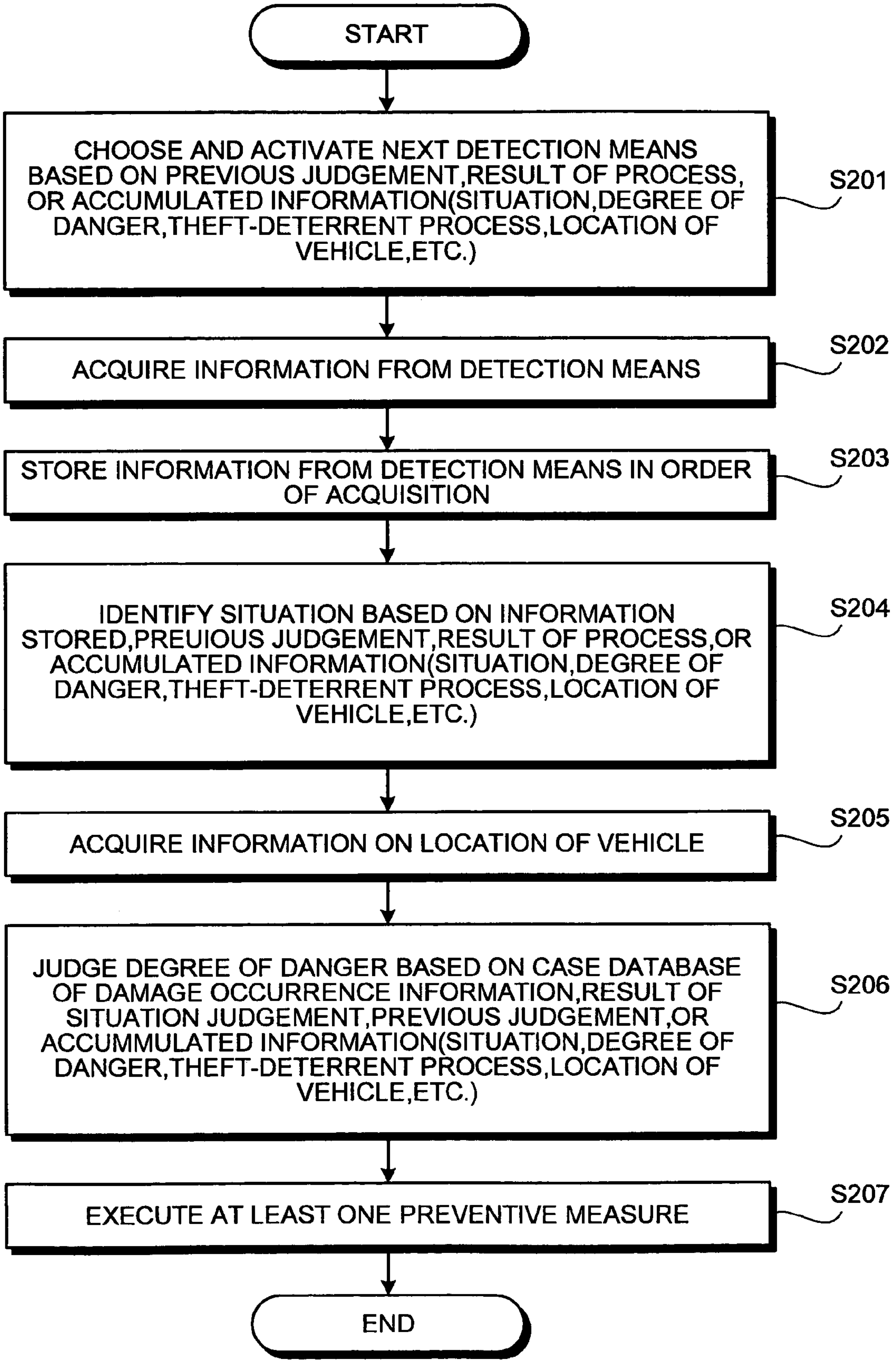
FIG. 2 is a flowchart of process procedure of a vehicle anti theft method according to the embodiment.

FIG. 1 is a block diagram of a vehicle anti theft system according to an embodiment of the present invention. FIG. 2 is a flowchart of process procedure of a vehicle anti theft method according to the embodiment.

The vehicle anti theft system 10 according to the present invention is connected to a GPS device 20, an input unit 30, an output unit 40, a communication device 50, a prevention section 60, a sensor group 70, a vehicle system 80, an odometer 91, and a key-loss detector 92, including a storage unit 11 and a controller 12. The GPS device 20 corresponds to a location identifying unit, the input unit 30, the communication device 50, the sensor group 70, a portion of the vehicle system 80, the odometer 91, and the key-loss detector 92 correspond to a detection unit, and the output unit 40, the communication device 50, the prevention section 60, and a portion of the vehicle system 80 correspond to a preventive unit.

The GPS device 20 acquires GPS signals from a satellite and obtains information on a current location of the vehicle. The input unit 30 includes a camera 31 as a photographing device and a microphone 31. The output unit 40 includes a speaker 41 that outputs alarms such as voice and a monitor 42 that displays images.

The communication device 40 carries out communication with an external unit such as a control center and information transmission server that control various kinds of information concerning vehicle theft, or cellular phone terminals.

The prevention section 60 includes a human figure generator 61, a security operation expressing device 62, and a windshield shutter operation unit 63. The human figure generator 61 generates human figures inside the vehicle by forming human figures by holograms, etc. A guard dog robot may also be arranged inside the vehicle. The security operation expressing device 62 simulates the high security level inside the vehicle by blinking, for example, LEDs. In addition, the windshield shutter operation 63 is equipped with a polarization plate in the windshield, temporarily scatters light from the outside, prevents any unauthorized person from looking into the vehicle inside, and prevents the people from judging the presence of the person inside the vehicle.

The sensor group 70 detects all information concerning theft and vandalizing, including an approach detection sensor 71 based on a UWB radar, etc., a contact detection sensor 72 based on a vibration sensor, a glass break sensor 73, a door pre-opening detection sensor 74 that detects someone unlocking the door, a pre-ignition detection sensor 75 that detects someone starting the engine, and an intrusion detection sensor 76.

The vehicle system 80 relates to drive of the vehicle, including an engine ECU 81, an immobilizer, a throttle 82, a steering ECU 83 having a mechanism for locking the steering itself, and a steering wheel 84.

The storage unit 11 stores data and programs necessary for various processing by the controller 12, and also stores various kinds of information that are primarily entered by the input unit 30, the communication device 50, etc. The storage unit 11 includes an anticrime map 11*a*, indicating a frequency of occurrence of the vehicle damage, from which the frequency of occurrence of the vehicle damage at a current location of the vehicle obtained by the GPS device 20 can be obtained. That is, by using the anticrime map 12*a*, information whether the vehicle is currently subject to an external damage can be obtained.

The controller 12 has an internal memory that stores control programs such as an operating system (OS) that specify various kinds of processing procedures, and required data. The controller 12 is a processing unit that executes various kinds of processing, including an information acquisition controller 12*a*, a situation identifier 12*b*, a danger identifying unit 12*c*, a theft prevention controller 12*d*, and a vehicle controller 12*e*. The information acquisition controller 12*a* and storage unit 11 correspond to an information acquiring/managing unit, the situation identifier 12*b* corresponds to a situation identifying unit, a danger identifying unit 12*c* corresponds to a degree-of-danger judging unit, theft prevention controller 12*d* corresponds to a theft-deterrent control unit. In addition, the anticrime map 12*a* corresponds to a map and the GPS device 20 corresponds to a location identifying unit.

The information acquisition controller 12*a* acquires various kinds of information that can be used for vehicle theft prevention from the information input via the GPS device 20, the input unit 30, the communication device 50, the sensor group 70, the odometer 91, the key-loss detector 92, and controls the information including the history. This control can be carried out by using, for example, a control table, which enables a quick access. The situation identifier 12*b* identifies a situation of the vehicle damage, under which the vehicle is presently subjected, based on various information stored in the storage unit 11.

The danger identifying unit 12*c* selects specific information that meets the situation, for example, information on the frequency of the occurrence of vehicle damage at the current location, from among various kinds of information stored in the storage unit 11, and judges the degree of danger based on the specific information selected. The danger identifying unit 12*c* may be designed to directly judge the degree-of danger based on various kinds of stored information without obtaining the situation information from the situation identifier 12*b*. In such a case, the situation identifier 12*b* is removed from the controller 12.

The theft prevention controller 12*d* performs a control to prevent vehicle damage corresponding to the degree of danger judged by the danger identifying unit 12*c*. For example, when the degree of danger is low, the security operation expressing device 62 only is operated and when the degree of danger is high, human figures are generated by the human figure generator 61 or peeping in of the vehicle inside is blocked by the windshield shutter-operation unit 63, to take necessary measures to prevent vehicle damage. That is, one or more preventive action unit corresponding to the degree of danger are selected from a plurality of preventive action units, and a control for preventing vehicle damage is implemented using the preventive action unit selected. Thus, the theft-deterrent system can carry out flexible and precise prevention against various kinds of vehicle damage by effectively utilizing various kinds of information from a plurality of detection units as an input system and efficiently using a plurality of preventive action units as an output system. In addition, the theft-deterrent system can flexibly meet the situation to add or delete new detection unit or preventive action unit.

The prevention section 60 may be intended to carry out preventive actions of levels corresponding to the degree of danger by obtaining the information of the degree of danger from the theft prevention controller 12*d*. In such a case, the prevention section 60 must have corresponding action unit that a plurality of preventive actions can be taken in accordance with the level of danger. That is, the theft prevention controller 12*d* may adopt a central-control for theft prevention control of each unit of the prevention section 60, or distributed control for theft prevention control of each unit of the prevention section 60. For example, in case of simple control of lighting condition, the theft prevention controller 12*d* may send out the information of degree of danger only and may control dispersively, or may send out control signals for controlling the lighting state as it is and intensively and directly control. Furthermore, the theft prevention controller 12*d* does not use the situation identification by the situation identifier 12*b* or the degree of danger judgment by the danger identifying unit 12*c* and directly uses various kinds of information that the information acquisition controller 12*a* acquires only to prevent various kinds of vehicle damage. In such a case, the theft-deterrent system has a construction with the situation identifier 12*b* and danger identifying unit 12*c* removed from the controller 12.

In addition, the theft prevention controller 12*d* uses the results of situation identification by the situation identifier 12*b* or the results of danger degree judgment by the danger identifying unit 12*c* and selects one or more detection unit to be activated from a plurality of detection units to save electric power consumed by the detection unit or alleviate loads to microcomputer used for the controller 12. The operation condition of the non-selected detection units may be kept off or may be kept on the standby mode with the intermittent reception condition maintained.

The vehicle controller 12*e* carries out vehicle control of the vehicle system 80, etc., where vehicle control is carried out to prevent vehicle damage under the control of the theft prevention controller 12*d*. For example, for steering ECU 83, control to lock steering is carried out, thereby disabling the operation of the vehicle and preventing vehicle damage.

Referring to FIG. 2, the process procedure of theft-deterrent system 10 according to the present embodiment will be described. In Step S201, based on previous judgment or process results stored in the storage unit 11 or the results of information accumulated such as situation identification, judgment of degree of danger, theft prevention processing, vehicle location information,. etc., a necessary detection unit is selected and activated. Thus, the minimum information required for the identified situation can be obtained and at the same time, since all the detection units do not have to be constantly activated, the power consumption can be saved.

Next, the information from the detection unit is obtained at Step S202, and then, the information obtained in Step 203 is stored in a memory in order of acquisition. Furthermore, from the information obtained from the detection unit, previous judgment process results or information accumulated to date stored in memory in chronological order in Step S204, the situation is identified. Thus, the situation can be identified with consideration given to the conditions which are varied as the processing advances.

In Step S205, by acquiring vehicle location information and by acquiring the database of the information center which stores past damage conditions in memory, it becomes possible to judge whether or not the vehicle is stopped at a dangerous place. The database may be equipped to the vehicle itself or the past damage occurrence condition stored in the database may be updated by communicating with the information center at the specified time intervals or at the timing desired by the user, or the past damage occurrence condition may be updated by the use of recording media.

In Step S206, the database and situation are identified, the degree of danger can be judged from the previous judgment process results or past accumulated information. In Step S207, one or more preventive measures are implemented.

In addition, once any judgment and process are implemented, the results are stored in the storage unit. Thus, it is possible to make the best of the judgment and process results of theft-deterrent system stored for the subsequent judgment and process. In addition, if any damage is caused to the vehicle due to vandalizing, etc., or when the vehicle is returned to the owner after theft, the damage condition can be analyzed from the judgment and process history of the theft-deterrent system in memory and the results can be utilized for prevention of damage in the future. Furthermore, the information stored should be transmitted to the information center at the specified timing, or when the specified data is stored in memory, or when a specified volume of data is stored in memory.

In addition,.the situation may be identified or the degree of danger may be judged without using the previous judgment process results or accumulated results, or the program may not carry out the processing at Step 201.

Furthermore, as described above, the situation by the situation identifier 12*b* may not be carried out and the danger identified 12*c* may judge the degree of danger based on various kinds of information. In such a case, the vehicle anti theft system has a construction with step S204 deleted.

The information acquisition controller 12*a* of the vehicle anti theft system 10 acquires various kinds of information which can be used for prevention of vehicle damage from the information entered via GPS device 20, input unit 30, communication device 50, sensor group 70, odometer 91, key loss detector 92, etc. and controls them in the storage unit 11. Consequently, according to the present embodiment, it becomes possible to extensively acquire and control effective information concerning prevention of vehicle damage.

Specifically, the information acquisition controller 12*a* acquires and controls information, as shown in FIG. 6 through FIG. 47, on detection of suspicious person, detection of contact, key robbery or loss, whether the vehicle is popular vehicle to be stolen, whether the vehicle is parked for a long time, change of vehicle condition by picking, glass breakage detection, detection of illegal key owner, detection of intruder, detection of wire harness operation, detection of EFI replacement, detection of transfer location, detection of license plate removal, detection of illegal use of parts, detection of use region, detection of approach, detection of uplift, detection of tire deflation, detection of placing a pedestal under the vehicle, detection of tire removal, detection of damage, detection of vandalizing with wipers, detection of someone climbing on hood, detection of fire on purpose, and others. Furthermore, cases of past vehicle damage are included and utilized for the database. That is, the information acquisition controller 12*a* acquires all then necessary information which could be used for judgment process such as situation identification, danger judgment, theft-deterrent control, etc. later discussed. This database can achieve still more appropriate theft-deterrent control by successively updating the database.

In addition, the information acquired by the information acquisition controller 12*a* is controlled by the storage unit 11, and read out and utilized as judgment material when judgment process as cited above is carried out. That is, when the above-mentioned judgment process, not only the information which the vehicle anti theft system 10 acquires on real-time but also the information acquired in the past is utilized for making a decision. That is, the information acquisition controller 12*a* carries out history control.

The image information, etc. entered by the vehicle anti theft system 10 via the camera 31, microphone 32, sensor group 70, etc. is appropriately analyzed by the information acquisition controller 12*a*, and converted into the information which can be directly utilized for making a decision. For example, when camera 31 is functioned as a human sensor on the basis of the image acquired by this camera 31, the information acquisition controller 12*a* carries out conversion to provide image processing to have the contour of the person from the image.

In addition, the theft prevention controller 12*d* chooses the detection unit to be activated based on the results of situation identification and judgment of degree of danger, brings the chosen detection unit to the operating condition, and sets the not-chosen detection unit to the standby condition or off condition. Thus, the electric power consumed by the detection unit can be reduced and the loads to the microcomputer used for controller 12 can be alleviated.

The situation identification 12*b* of the vehicle anti theft system 10 identifies the situation of vehicle damage on the basis of various kinds of information controlled in the storage unit 11. Consequently, according to the present embodiment, theft-deterrent control is enabled in accordance with the situations of vehicle damage. The process specific to this situation is not mandatory.

Specifically, as shown in FIG. 6 through FIG. 47, the situation identifier 12*b* is classified in chronological order in accord with each category of vehicle theft (drive-away), vehicle theft (wrecker), parts robbery, and vandalizing, and can be broadly classified into before theft, during theft, and after theft. In addition, for minor classifications, the vehicle theft (drive-away) is divided into hunting out and casing (plan) before theft, door unlocking, destroying, intrusion, engine start during theft, and transfer and selling after theft. Similarly, in case of vehicle theft (wrecker), the situation can be classified into hunting out and casing (plan) before theft, drive-up, uplift, set during theft, and transfer and selling after theft. Furthermore, the parts robbery is divided into hunting out and casing (plan) before theft, door unlocking, destroying, jacking up, intrusion, parts robbery during theft, run-away, and selling and use,after theft. In addition, vandalizing can be broadly classified into before vandalizing, during vandalizing, and after vandalizing. As minor classifications, before vandalizing can be further classified into hunting out and casing.

The theft prevention controller 12*d* may be intended to choose the acquired information in accordance with the specified situations. For example, as shown in FIG. 3, in case of vehicle theft (drive-away), in the situation before theft, the approach detection sensor 71, contact detection sensor 72, photographing device (camera 31), and key-loss detector 92 only should be brought into the active condition. In addition, in this situation, at least, alarm device (speaker 41), human figure generator 61, security operation expressing device 62, windshield shutter function (windshield shutter operation unit 63), and radio communication equipment (communication device 50) only should be brought to the active condition. Thus, the information minimum required for the specific situation can be obtained and at the same time, reduction of consumed power can be achieved, too.

The danger identifying unit 12*c* of the vehicle anti theft system 10 chooses the specified information in accordance With the situation from various kinds of information controlled in the storage unit 11, and judges the degree of danger of the vehicle on the basis of the specified information chosen. Consequently, according to the present embodiment, appropriate information is chosen and the degree of danger can be appropriate judged.

Specifically, as shown in FIG. 6 through FIG. 31, the danger identifying unit 12*c* judges the current degree of danger of the vehicle on the basis of present and past information in accordance with the specified situation. For example, in the situation before theft in case of vehicle theft (drive-away), the degree of danger is classified into three stages, and the danger identifying unit 12*c* judges the case as danger degree "1" when any of the approach detection sensor 71 and contact detection sensor 71 do not detect, it judges the case as danger degree "2" when the approach detection sensor 71 only detects, and it judges the case as danger degree "3" when both approach detection sensor 71 and contact detection sensor 72 detect. Now, by considering the specified situation, even when the information from the same sensor is detected, the case can be judged as, the one with varying degree of danger in view of the seriousness of the situation, and proper judgment can be made on the degree of danger. For example, in case of the same uplift, the case can be judged as vehicle theft by wrecker or tire theft based on the information as to whether the inclination detected by the inclination sensor is longitudinal or horizontal, and based on this, the magnitude of danger degree can be varied. The danger identifying unit 12*c* may judge the degree of danger by the use of the database or may infer the degree of danger by the use of inference functions. Furthermore, when the above-mentioned situation identifier 12*b* identifies the situation, the situation identifier 12*b* may be intended to use the database or inference functions. This inference function can be achieved by carrying out inference using, for example, known rules or conditional expressions. The conditional expressions can determine whether it is vehicle theft or tire theft by determining whether the inclination of vehicle is longitudinal or horizontal, or whether it is vehicle theft or vandalizing by determining the magnitude of the inclination, and as a result, the magnitude of danger degree can be determined. Furthermore, based on agreement and non-agreement of various conditional expressions with respect to various kinds of information, it is possible to judge the degree of danger comprehensively and highly accurately.

The theft prevention controller 12*d* of the vehicle anti theft system 10 carries out preventive control of vehicle damage in accordance with the degree of danger judged by the danger identifying unit 12*c*. Thus, the final vehicle damage can be prevented.

Specifically, the theft prevention controller 12*d* uses each section of theft prevention which can be used for situations not currently specified, for example, speaker 41, human figure generator 61, and others in accordance with the degree of danger.

For example, if the degree of danger is "2" in the situation before theft in case of vehicle theft (drive-away), the security operation expressing device 62 is operated, and if the degree of danger is "3", the windshield shutter operation unit 63 is operated to disable peeping-in of the vehicle inside and prevent vehicle theft.

Referring to FIG. 4, a specific example of theft prevention control before theft and during theft, and rescue control of stolen vehicle after theft will be discussed. As shown in FIG. 4, the situation of "casing" before theft can be identified by the detection by the camera and approach sensor. Similarly, the situation of "drive-in" during theft can be identified by the detection of camera and approach sensor.

In addition, "hoisting of vehicle" during theft can be identified by the detection of camera, contact sensor, and inclination sensor. Similarly, the situation of "setting" during theft can be identified by the detection by contact sensor and inclination sensor. Furthermore, the situation of "transfer" of the vehicle after theft can be identified by the detection of camera and GPS.

And in the situation before theft, when the judgment made by the approach sensor is "no approach", the case is judged as "0" degree, of danger. In addition, even if the approach sensor judges "with approach", when the owner face, etc. can be recognized by the use of camera, the case is judged as "0" degree of danger.

On the other hand, when the approach sensor judges "with approach" and the face other than the owner is recognized by the use of camera, the case is judged as "1" degree of danger, and "the face is filmed and stored in memory" as theft prevention control.

Furthermore, when the sensor judges "with approach" and the camera recognizes a face other than the owner more than the specified times, the case is judged as "2" degree of danger and "alarm by the use of voice, blinker light, etc.", "annunciation by communication", and "notification by voice and display (monitor) when the owner rides on the vehicle next time" are carried out.

And in the situation during theft, when the approach sensor judges "no approach", the case is judged as "0" degree of danger. On the other hand, when the approach sensor is judged "with approach" and a wrecker is recognized by the use of camera, the contact sensor judges "with contact", and the inclination sensor judges "no inclination", the case is judged as "1" degree of danger and "the wrecker is filmed and stored in memory" as the theft prevention control, and "annunciation by communication" is executed.

Furthermore, when the contact sensor judges "with contact" and the inclination sensor detects "slight inclination", the case is judged as "2" degree of danger, and as theft prevention control, "filming the wrecker and storing in memory", "alarm output by horn", and "annunciation by communication" are executed. In addition, the contact sensor judges "with contact" and the inclination sensor detects "severe inclination", the case is judged as "3" degree of danger, and as theft prevention control, "filming the wrecker and storing in memory", "demoralizing by the use of smoke generator", and "annunciation by communication" are executed.

Furthermore, in the situation after theft, when GPS judges "no transfer", the case is judged as "3" degree of danger". On the other hand, when GPS detects the transfer of the vehicle and the camera detects changes of scenery, as stolen vehicle rescue control, "reporting to the user and the specified institutions (police department and security company)", "alarm output by horn", "operation nullification of vehicle equipment", etc are carried out. In addition, it is effective to rescue the stolen vehicle to store the locational changes of the vehicle detected by GPS and changes of sceneries filmed by camera.

The inclination sensor as a detection unit is further utilized as an alarm unit to use a horn, blinker light, smoke generator, flash by stroboscope, etc. In this way, the configuration of theft-deterrent system shall not be limited to the configuration shown in FIG. 1 and can be changed as required by using various kinds of vehicle-mounted equipment and mounting new equipment.

So far, the embodiments of the present invention have been described, however, in addition to the embodiments described above, the present invention can be practiced in various embodiments within the purview of the technical idea cited in the scope of claims. Therefore, in the following part of this section, various embodiments will be described by classifying into (1) acquisition of information, (2) situation identification, (3) danger identification, (4) theft prevention control, and (5) others.

For example, in the present embodiments, using unit such as the camera 31, the communication device 50, the sensor group 70, and others, cases to acquire various kinds of information which can be utilized for theft prevention control from the inside and outside of the vehicle are discussed, but the method of acquiring information shall not be restricted to those but, for example, the varying vehicle damage conditions, etc. may be acquired in real time.

For various kinds of information obtained from the outside of the vehicle, the theft information may be notified to each vehicle or vehicle owner if any theft occurs in the parking lot in which the vehicle is placed.

In the present embodiments, the situations are set in time series in accord with the type of vehicle damage such as vehicle theft (drive-away), but without limiting embodiments to this, situations may be optionally classified. For example, even during vehicle theft (drive-away), the situation may be classified by intrusion courses.

In the present embodiments, the case in which the degree of danger is judged by 3 stages is discussed, but embodiments shall not be limited to these but the degree of danger may be judged by 2 stages. In such event, the content of theft prevention control must be classified into two stages in accordance with the degree of danger. In addition, same as in situation identification, each piece of information is weighted when situation and danger are identified, and based on these results, the situation and danger degree may be numerically identified or judged.

In the present embodiments, the theft prevention control is applied to the prevention section 60 or the vehicle system 80, however, the embodiments are not limited to these. For example, an airbag may be activated to cause interference to driving a vehicle. In addition, when any theft occurs in the above-mentioned parking lot, or when it is judged that the high degree of danger results, entry and exit of the parking lot are closed or severe process is provided as required.

Functions of all the component elements of each device illustrated are merely basic idea, and are not necessarily physically arranged as illustrated. That is, the specific form of disintegration and integration of each device is not limited to those illustrated, and whole or part of component elements can be constructed by functionally or physically disintegrating and integrating them in optional units in accord with various loads and use conditions. For example, the information acquisition controller 12*a* may be installed in the communication device 50, or vehicle controller 12*e* may be installed in engine ECU. This is disintegration of controller 12 and is integration as viewed from the communication device 50. In addition, unification of controller 11 and storage unit 12 is integration. Furthermore, each processing function which is carried out in each device can be in whole or in part achieved by CPU and a program which is analyzed and executed by the relevant CPU or can be achieved as hardware by wired logic.

In addition, of each process described in the present embodiments, whole or part of the process which is explained to be carried out automatically may be carried out manually, or vice versa. In addition, process procedures, control procedures, specific designations, and information including various data and parameters shown in the above document and drawings may be optionally changed unless otherwise specified.

The vehicle anti theft method described in the present embodiment can be achieved by executing a previously prepared program by an in-vehicle computer. This program can be distributed via a network such as Internet, etc. In addition, this program can be executed by being recorded in a recording medium that can be read by computer such as a hard disk (HD), a flexible disk (FD), a compact disk-read only memory (CD-ROM), a magneto-optical (MO) disk, a digital versatile disk (DVD).

As described above, according to the present invention, even when the number of detection units or preventive units is reduced or increased, the vehicle damage can be prevented flexibly and reliably.

Furthermore, according to the present invention, it is possible to reduce power consumption in carrying out vehicle theft prevention and alleviate loads to a microcomputer.

Moreover, according to the present invention, theft-deterrent control in each situation can be performed comparatively easily.

Furthermore, according to the present invention, it is possible to carry out theft prevention still more appropriately.

Moreover, according to the present invention, it is possible to carry out flexible theft-deterrent actions as well as alleviating control loads of theft-deterrent control unit.

Furthermore, according to the present invention, it is possible to accumulate and utilize changes generated to the vehicle and measures implemented.

Moreover, according to the present invention, it is possible to accumulate and refer to changes generated to the vehicle and actions implemented, and choosing and implementing necessary detection actions.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A theft-deterrent system for a vehicle, comprising:
- at least one detecting unit that detects information on damage of the vehicle including vehicle theft or vandalizing of the vehicle;
- at least one prevention unit that executes a preventive measure against the damage;
- a situation identifying unit that identifies a situation of the damage based on order of detection of the information;
- a degree-of-danger judging unit that judges a degree of danger based on the situation; and
- a theft-deterrent control unit that selects and controls the at least one prevention unit corresponding to the degree of danger to execute the preventive measure against the damage;
- wherein information for damage identification includes a plurality of scenes classified in chronological order from before occurrence of the damage to after the occurrence of the damage; and
- wherein the situation identifying unit identifies the situation of the damage based on the information.

2. The theft-deterrent system according to claim 1, further comprising an information acquiring/managing unit that acquires the information detected by the at least one detecting unit, and at least manages the information, wherein
- the degree-of-danger judging unit takes the information into account when judging the degree of danger.

3. The theft-deterrent system according to claim 2, wherein the information acquiring/managing unit selectively controls acquisition of the information in accordance with the situation.

4. The theft-deterrent system according to claim 1, further comprising:
- a map that displays a frequency of occurrence of the damage; and
- a location identifying unit that identifies a current location of the vehicle, wherein
- the degree-of-danger judging unit takes the frequency of occurrence of the damage corresponding to the current location of the vehicle into account when judging the degree of danger.

5. The theft-deterrent system according to claim 1, further comprising a database that stores data on a past case of the damage, wherein
- the theft-deterrent control unit refers to the database when selecting the at least one prevention unit.

6. The theft-deterrent system according to claim 1, further comprising a database that stores data on a past case of the damage, wherein
- the degree-of-danger judging unit refers to the database when judging the degree of danger.

7. The theft-deterrent system according to claim 1, further comprising a deducting unit that deducts at least one of selection of the at least one prevention unit, identification of the situation, and judgment of the degree of danger.

8. The theft-deterrent system according to claim 1, wherein the at least one preventive unit includes an executing unit that executes a plurality of preventive measures corresponding to the degree of danger.

9. The theft-deterrent system according to claim 1, further comprising a memory that stores at least one of results of identification by the situation identifying unit, judgment by the degree-of-danger judging unit, execution of the preventive measure, and identification of the current location of the vehicle.

10. The theft-deterrent system according to claim 9, further comprising a selecting unit that selects the at least one detecting unit to be activated next, based on the results stored in the memory, and activates the at least one detecting unit selected.

11. The theft-deterrent system according to claim 1, wherein the at least one detecting unit includes any one of or a combination of a camera, a microphone, a communication device, an approach sensor, a contact sensor, an inclination sensor, a glass break sensor, a door pre-opening sensor, an engine pre-ignition sensor, an intrusion sensor, an odometer, and a key-loss detector.

12. The theft-deterrent system according to claim 1, wherein the at least one prevention unit includes any one of or a combination of a speaker, a monitor, a horn, a blinker light, a smoke generator, a flash, a communication device, a human figure generator, a security operation expressing device, a windshield shutter operation unit.

13. A theft-deterrent method for a vehicle, comprising:

detecting information on damage of the vehicle including vehicle theft or vandalizing of the vehicle;

identifying a situation of the damage based on order of detection of the information;

judging a degree of danger based on the situation;

selecting a preventive measure corresponding to the degree of danger; and executing the preventive measure against the damage;

wherein information for damage identification includes a plurality of scenes classified in chronological order from before occurrence of the damage to after the occurrence of the damage; and wherein a situation identifying unit identifies the situation of the damage based on the information.

14. A computer program for theft deterrent of a vehicle, making a computer execute:

detecting information on damage of the vehicle including vehicle theft or vandalizing of the vehicle;

identifying a situation of the damage based on order of detection of the information;

judging a degree of danger based on the situation;

selecting a preventive measure corresponding to the degree of danger; and executing the preventive measure against the damage; and wherein information for damage identification includes a plurality of scenes classified in chronological order from before occurrence of the damage to after the occurrence of the damage; and wherein the situation of the damage is identified based on the information.

* * * * *